US008456665B2

(12) United States Patent
Ferlitsch

(10) Patent No.: US 8,456,665 B2
(45) Date of Patent: Jun. 4, 2013

(54) METHODS AND SYSTEMS FOR PRINTING ERROR RECOVERY

(75) Inventor: Andrew R. Ferlitsch, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 1444 days.

(21) Appl. No.: 09/967,592

(22) Filed: Sep. 28, 2001

(65) Prior Publication Data

US 2002/0089692 A1 Jul. 11, 2002

Related U.S. Application Data

(60) Provisional application No. 60/261,132, filed on Jan. 11, 2001.

(51) Int. Cl.
*G06F 3/12* (2006.01)

(52) U.S. Cl.
USPC ....... 358/1.15; 358/1.13; 358/1.14; 358/1.16; 399/16; 399/18; 399/19; 399/24; 399/27; 710/17

(58) Field of Classification Search
USPC ...... 358/1.13, 1.14, 1.15, 437, 1.16; 709/321; 395/114; 399/16, 18, 19, 24, 27; 710/17
See application file for complete search history.

(56) References Cited

U.S. PATENT DOCUMENTS

| 5,128,878 | A | 7/1992 | Gore et al. | |
|---|---|---|---|---|
| 5,241,397 | A | 8/1993 | Yamada | 358/296 |
| 5,287,194 | A | 2/1994 | Lobiondo | 358/296 |
| 5,467,434 | A | 11/1995 | Hower et al. | |
| 5,528,734 | A | 6/1996 | Sanchez | 395/115 |
| 5,547,178 | A | 8/1996 | Costello | |
| 5,550,954 | A | 8/1996 | Campbell et al. | |
| 5,630,062 | A * | 5/1997 | Okutsu | 718/100 |
| 5,697,040 | A | 12/1997 | Rabjohns et al. | |
| 5,699,495 | A | 12/1997 | Snipp | |
| 5,781,711 | A * | 7/1998 | Austin et al. | 358/1.15 |
| 5,822,500 | A | 10/1998 | Utsunomiya et al. | |
| 5,845,058 | A | 12/1998 | Shaw et al. | 395/114 |
| 5,859,711 | A | 1/1999 | Barry et al. | 358/296 |
| 5,867,706 | A | 2/1999 | Martin et al. | |
| 5,897,260 | A | 4/1999 | Zingher | 400/719 |
| 5,918,988 | A | 7/1999 | Van Oijen | |
| 5,940,186 | A | 8/1999 | Barry et al. | |
| 5,960,168 | A * | 9/1999 | Shaw et al. | 358/1.15 |
| 5,978,560 | A | 11/1999 | Tan et al. | |
| 5,978,650 | A | 11/1999 | Fischer et al. | 455/3.1 |

(Continued)

FOREIGN PATENT DOCUMENTS

EP 0738949 12/1996
JP 64-014043 1/1989

(Continued)

OTHER PUBLICATIONS

U.S. Appl. No. 09/964,985—Final Office Action dated Jul. 22, 2009.

(Continued)

*Primary Examiner* — Vu B Hang
(74) *Attorney, Agent, or Firm* — Krieger Intellectual Property, Inc.; Scott C. Krieger

(57) ABSTRACT

Embodiments of the present invention comprise systems and methods for detecting the status of printing devices and recovering from printing errors.

8 Claims, 26 Drawing Sheets

U.S. PATENT DOCUMENTS

| | | | |
|---|---|---|---|
| 5,982,996 A * | 11/1999 | Snyders | 358/1.15 |
| 5,995,721 A | 11/1999 | Rourke et al. | 395/114 |
| 5,995,723 A | 11/1999 | Sperry et al. | 395/114 |
| 6,049,394 A | 4/2000 | Fukushima | |
| 6,055,063 A | 4/2000 | Yang et al. | |
| 6,057,930 A | 5/2000 | Blossey et al. | |
| 6,078,960 A | 6/2000 | Ballard | |
| 6,088,120 A | 7/2000 | Shibusawa et al. | 358/1.15 |
| 6,101,508 A | 8/2000 | Wolff | |
| 6,118,546 A | 9/2000 | Sanchez et al. | |
| 6,148,346 A * | 11/2000 | Hanson | 719/321 |
| 6,157,465 A | 12/2000 | Suda et al. | 358/407 |
| 6,172,765 B1 | 1/2001 | Kawamoto | |
| 6,173,295 B1 | 1/2001 | Goertz et al. | |
| 6,219,151 B1 | 4/2001 | Manglapus et al. | |
| 6,229,622 B1 | 5/2001 | Takeda | 358/1.16 |
| 6,248,996 B1 | 6/2001 | Johnson et al. | 250/234 |
| RE37,258 E | 7/2001 | Patel et al. | 358/1.15 |
| 6,266,150 B1 | 7/2001 | Brossman et al. | 358/1.15 |
| 6,320,667 B1 | 11/2001 | Mitsuhashi | |
| 6,337,745 B1 | 1/2002 | Aiello, Jr. et al. | 358/1.15 |
| 6,348,971 B2 | 2/2002 | Owa et al. | |
| 6,348,972 B1 | 2/2002 | Taniguchi et al. | |
| 6,397,245 B1 | 5/2002 | Johnson et al. | |
| 6,452,692 B1 * | 9/2002 | Yacoub | 358/1.15 |
| 6,474,881 B1 | 11/2002 | Wanda | |
| 6,476,927 B1 | 11/2002 | Schwarz, Jr. | |
| 6,509,974 B1 | 1/2003 | Hansen | |
| 6,529,286 B1 * | 3/2003 | King | 358/1.14 |
| 6,552,813 B2 | 4/2003 | Yacoub | |
| 6,570,669 B1 | 5/2003 | Onuma | |
| 6,580,521 B1 | 6/2003 | Nishikawa et al. | |
| 6,584,503 B1 | 6/2003 | Carney et al. | |
| 6,609,210 B1 | 8/2003 | Onuma | |
| 6,618,167 B1 | 9/2003 | Shah | |
| 6,624,909 B1 | 9/2003 | Czyszczewski et al. | |
| 6,654,136 B2 | 11/2003 | Shimada | |
| 6,654,509 B2 | 11/2003 | Nishikawa et al. | |
| 6,661,531 B1 | 12/2003 | Murphy et al. | |
| 6,665,082 B1 | 12/2003 | Takeoka et al. | |
| 6,697,165 B2 | 2/2004 | Wakai et al. | |
| 6,700,678 B1 | 3/2004 | Luman | |
| 6,707,568 B1 | 3/2004 | Yu | |
| 6,724,494 B1 * | 4/2004 | Dannick | 358/1.14 |
| 6,748,471 B1 | 6/2004 | Keeney et al. | |
| 6,757,071 B1 | 6/2004 | Goodman et al. | |
| 6,816,270 B1 | 11/2004 | Cooper et al. | |
| 6,825,943 B1 | 11/2004 | Barry et al. | |
| 6,863,367 B2 | 3/2005 | Hamamoto et al. | |
| 6,891,632 B2 | 5/2005 | Schwartz | |
| 6,956,664 B1 | 10/2005 | Kutty | |
| 6,965,958 B1 | 11/2005 | Sugiyama | |
| 6,985,245 B1 | 1/2006 | Takahashi | |
| 7,031,014 B2 | 4/2006 | Ohwa | |
| 7,046,384 B2 | 5/2006 | Ferlitsch et al. | |
| 7,072,057 B1 | 7/2006 | Hansen | |
| 7,081,969 B1 * | 7/2006 | Motamed et al. | 358/1.16 |
| 7,084,998 B2 | 8/2006 | Blair | |
| 7,139,085 B1 | 11/2006 | Sakaguchi | |
| 7,148,980 B2 | 12/2006 | Tominaga | |
| 7,155,669 B1 | 12/2006 | Nakagiri et al. | |
| 7,161,693 B2 | 1/2007 | Kizaki et al. | |
| 7,239,411 B2 | 7/2007 | Kelsey | |
| 2001/0038462 A1 | 11/2001 | Teeuwen et al. | 358/1.15 |
| 2002/0001495 A1 * | 1/2002 | Mochizuki | 400/61 |
| 2002/0027673 A1 | 3/2002 | Roosen et al. | |
| 2002/0042798 A1 | 4/2002 | Takei et al. | |
| 2002/0059489 A1 | 5/2002 | Davis et al. | |
| 2002/0060801 A1 | 5/2002 | Motomed et al. | |
| 2002/0101600 A1 | 8/2002 | Sabbagh et al. | |
| 2002/0101604 A1 | 8/2002 | Mima et al. | |
| 2002/0112037 A1 | 8/2002 | Koss | |
| 2002/0113989 A1 | 8/2002 | Ferlitsch et al. | |
| 2002/0138564 A1 | 9/2002 | Treptow et al. | |
| 2002/0163665 A1 | 11/2002 | Iwata et al. | |
| 2002/0186407 A1 * | 12/2002 | Laughlin | 358/1.15 |
| 2003/0002069 A1 | 1/2003 | Bhogal et al. | |
| 2003/0011812 A1 | 1/2003 | Sesek et al. | |
| 2003/0038964 A1 | 2/2003 | Ferlitsch | |
| 2003/0048472 A1 | 3/2003 | Perdu et al. | |
| 2003/0184782 A1 | 10/2003 | Perkins et al. | |
| 2004/0042042 A1 | 3/2004 | Utsunomiya | |
| 2004/0105122 A1 | 6/2004 | Schaeffer | |
| 2006/0033958 A1 | 2/2006 | d'Entrecasteaux | |
| 2006/0155825 A1 | 7/2006 | Torii | |

FOREIGN PATENT DOCUMENTS

| | | |
|---|---|---|
| JP | 03282727 | 12/1991 |
| JP | 04-199218 | 7/1992 |
| JP | 04217550 | 8/1992 |
| JP | 05-270064 | 10/1993 |
| JP | 06-004239 | 1/1994 |
| JP | 07219731 | 8/1995 |
| JP | 08-101754 | 4/1996 |
| JP | 09-030040 | 2/1997 |
| JP | 09-130573 | 5/1997 |
| JP | 09-134340 | 5/1997 |
| JP | 09222964 | 8/1997 |
| JP | 09-319530 | 12/1997 |
| JP | 10-027149 | 1/1998 |
| JP | 10027076 | 1/1998 |
| JP | 10-031750 | 2/1998 |
| JP | 10-078618 | 3/1998 |
| JP | 10154049 | 6/1998 |
| JP | 10-187393 | 7/1998 |
| JP | 10-207643 | 8/1998 |
| JP | 10240477 | 9/1998 |
| JP | 10-283130 | 10/1998 |
| JP | 10-340166 | 12/1998 |
| JP | 10-340167 | 12/1998 |
| JP | 11-015608 | 1/1999 |
| JP | 11-024860 | 1/1999 |
| JP | 11110143 | 4/1999 |
| JP | 11-143661 | 5/1999 |
| JP | 11-167323 | 6/1999 |
| JP | 11219265 | 8/1999 |
| JP | 11296333 | 10/1999 |
| JP | 2000003258 | 1/2000 |
| JP | 2000-099303 | 4/2000 |
| JP | 2000-132347 | 5/2000 |
| JP | 2000-151873 | 5/2000 |
| JP | 2000-309147 | 11/2000 |
| JP | 2001071590 | 3/2001 |
| JP | 2001-088405 | 4/2001 |
| JP | 2001-265556 | 9/2001 |
| JP | 2005-078461 | 3/2005 |
| WO | WO01/31432 | 5/2001 |

OTHER PUBLICATIONS

U.S. Appl. No. 11/548,683—Notice of Allowance dated Oct. 15, 2009.

Japanese Office Action JP2006-127818 corresponding to U.S. Appl. No. 11/125,524 which has technical similarities to the present application.

Japanese Office Action JP2002-327343 corresponding to U.S. Appl. No. 10/010,112 which has technical similarities to the present application.

U.S. Appl. No. 09/964,985—Office Action dated Dec. 17, 2008.
U.S. Appl. No. 09/964,985—Office Action dated Aug. 5, 2008.
U.S. Appl. No. 11/548,683—Office Action dated Apr. 30, 2009.
U.S. Appl. No. 11/548,683—Office Action dated Aug. 14, 2008.
U.S. Appl. No. 10/404,789—Office Action dated Nov. 10, 2008.
U.S. Appl. No. 09/683,667—Office Action dated Oct. 31, 2008.
U.S. Appl. No. 09/683,667—Notice of Allowance dated Feb. 9, 2009.
U.S. Appl. No. 09/894,928—Notice of Allowance dated Sep. 15, 2008.
U.S. Appl. No. 09/932,661—Notice of Allowance dated Dec. 12, 2007.
U.S. Appl. No. 10/396,201—Notice of Allowance dated Jun. 18, 2007.
U.S. Appl. No. 09/681,208—Office Action dated Jul. 19, 2007.
U.S. Appl. No. 09/681,208—Office Action dated Jan. 8, 2007.
U.S. Appl. No. 09/681,208—Office Action dated Jul. 28, 2006.
U.S. Appl. No. 09/681,208—Office Action dated Jan. 12, 2006.

U.S. Appl. No. 09/681,208—Office Action dated May 4, 2005.
U.S. Appl. No. 09/681,208—Office Action dated Oct. 22, 2004.
U.S. Appl. No. 09/681,416—Office Action dated Aug. 11, 2005.
U.S. Appl. No. 09/681,416—Office Action dated Nov. 16, 2004.
U.S. Appl. No. 09/681,409—Office Action dated Aug. 11, 2006.
U.S. Appl. No. 09/681,409—Office Action dated Jan. 25, 2006.
U.S. Appl. No. 09/681,409—Office Action dated Jul. 29, 2005.
U.S. Appl. No. 09/681,409—Office Action dated Nov. 17, 2004.
U.S. Appl. No. 09/683,667—Office Action dated Apr. 15, 2008.
U.S. Appl. No. 09/683,667—Office Action dated Oct. 29, 2007.
U.S. Appl. No. 09/683,667—Office Action dated May 7, 2007.
U.S. Appl. No. 09/683,667—Office Action dated Nov. 17, 2006.
U.S. Appl. No. 09/683,667—Office Action dated Jun. 1, 2006.
U.S. Appl. No. 09/683,667—Office Action dated Dec. 13, 2005.
U.S. Appl. No. 09/683,667—Office Action dated Jun. 22, 2005.
U.S. Appl. No. 10/404,789—Office Action dated May 21, 2008.
U.S. Appl. No. 10/404,789—Office Action dated Nov. 28, 2007.
U.S. Appl. No. 10/404,789—Office Action dated Jul. 11, 2007.
U.S. Appl. No. 10/404,789—Office Action dated Feb. 6, 2007.
U.S. Appl. No. 10/404,789—Office Action dated Aug. 23, 2006.
U.S. Appl. No. 10/404,789—Office Action dated Mar. 15, 2006.
U.S. Appl. No. 10/404,789—Office Action dated Jul. 27, 2005.
U.S. Appl. No. 10/003,800—Office Action dated Apr. 20, 2006.
U.S. Appl. No. 10/003,800—Office Action dated Dec. 13, 2005.
U.S. Appl. No. 10/003,800—Office Action dated Jun. 15, 2005.
U.S. Appl. No. 09/683,162—Office Action dated Apr. 16, 2008.
U.S. Appl. No. 09/683,162—Office Action dated Oct. 29, 2007.
U.S. Appl. No. 09/683,162—Office Action dated May 17, 2007.
U.S. Appl. No. 09/683,162—Office Action dated Nov. 27, 2006.
U.S. Appl. No. 09/683,162—Office Action dated Jan. 10, 2006.
U.S. Appl. No. 09/683,162—Office Action dated Jun. 22, 2005.
U.S. Appl. No. 09/894,928—Office Action dated Mar. 17, 2008.
U.S. Appl. No. 09/894,928—Office Action dated Sep. 11, 2007.
U.S. Appl. No. 09/894,928—Office Action dated Mar. 2, 2007.
U.S. Appl. No. 09/894,928—Office Action dated Sep. 7, 2006.
U.S. Appl. No. 09/894,928—Office Action dated Mar. 15, 2006.
U.S. Appl. No. 09/894,928—Office Action dated Sep. 8, 2005.
U.S. Appl. No. 10/396,201—Office Action dated Jan. 23, 2007.
U.S. Appl. No. 09/964,985—Office Action dated Jan. 4, 2008.
U.S. Appl. No. 09/964,985—Office Action dated Jul. 17, 2007.
U.S. Appl. No. 09/964,985—Office Action dated Jan. 25, 2007.
U.S. Appl. No. 09/964,985—Office Action dated Aug. 10, 2006.
U.S. Appl. No. 09/964,985—Office Action dated Mar. 13, 2006.
U.S. Appl. No. 09/964,985—Office Action dated Sep. 13, 2005.
U.S. Appl. No. 09/932,661—Office Action dated Jun. 8, 2007.
U.S. Appl. No. 09/932,661—Office Action dated Jun. 27, 2006.
U.S. Appl. No. 09/932,661—Office Action dated Nov. 28, 2005.
U.S. Appl. No. 09/932,661—Office Action dated May 4, 2005.
U.S. Appl. No. 10/002,781—Office Action dated Nov. 17, 2006.
U.S. Appl. No. 10/002,781—Office Action dated May 1, 2006.
U.S. Appl. No. 10/002,781—Office Action dated Nov. 28, 2005.
U.S. Appl. No. 10/002,781—Office Action dated Jun. 15, 2005.
IBM AS/40 Printing V, Oct. 2000, http://www.redbooks.ibm.com/redbooks/pdfs/sg242160.pdf.
PostScript Language Document Structuring Conventions Specification, Version 3.0, Adobe Systems Incorporated, 1992.

* cited by examiner

METHODS AND SYSTEMS FOR PRINTING ERROR RECOVERY

CROSS REFERENCE TO RELATED APPLICATIONS

This application claims the benefit of U.S. Provisional Patent Application Ser. No. 60/261,132, entitled "Methods and Systems for Print-Processor-Modified Printing," invented by Andrew Rodney Ferlitsch, et al., filed Jan. 11, 2001.

The following patent applications are hereby incorporated herein by reference:

U.S. patent application Ser. No. 09/894,928, filed Jun. 28, 2001, entitled "Methods and Systems for Page-Independent Spool File Sheet Assembly," invented by Andrew Rodney Ferlitsch;

U.S. patent application Ser. No. 09/681,409, filed Mar. 30, 2001, entitled "Methods and Systems for Print-Processor-Based Printer Status Detection and Print Task Distribution," invented by Andrew Rodney Ferlitsch;

U.S. patent application Ser. No. 09/681,416, filed Mar. 30, 2001, entitled "Methods and Systems for Print-Processor-Based Print Task Error Recovery," invented by Andrew Rodney Ferlitsch; and U.S. patent application Ser. No. 09/681,208, filed Feb. 22, 2001, entitled "Methods and Systems for Print-Processor-Modified Printing," invented by Andrew Rodney Ferlitsch, et al.

BACKGROUND

Many offices can generate a high volume of printer output or require high print rates to meet deadlines. When these needs are fairly constant, large, high-production printers and associated hardware may be required. These high-production units are expensive to procure and maintain and, generally, are only made economically feasible by a constant high demand for printer output. When printer requirements fluctuate, the costs of these high-production printers are difficult to justify. However, when sporadic, high printer throughput is a necessity, some offices are forced to bear the costs of expensive printer equipment that runs at well below its capacity most of the time.

Cluster printing has been introduced to avoid this problem. Cluster printing involves the use of multiple printers in a network. With cluster printing, print jobs can be sent to a multiple printer network with a capacity that rivals the capacity of expensive, high-throughput equipment. Generally, this network is comprised of multiple lower-production printers that may already exist in an office environment making the cost of the network very manageable.

Through the use of cluster printing, a user may choose to split a single print job among several printers to increase print job speed and decrease print time. Print jobs that include multiple copies may be divided so that each printer in a network prints some of the copies. Other variations of print job distribution may also be implemented, such as color/black-and-white separation.

Cluster printing may be implemented through specialized printers that contain cluster-enabling firmware. When these printers are interconnected via cables, they can share printing jobs. In some cases, the marking engines are connected to enable division of printing tasks between the connected printers.

Other methods of implementing cluster printing functions require the use of additional hardware. Typically, a specialized print server is used. This server is generally a high-performance general purpose computer to which print jobs are directed by the network. Specialized software on the server allows print jobs or copies thereof to be distributed among multiple printers that are managed by the server.

These known cluster printing implementations require specialized printer or server hardware or software to provide cluster printing functions.

Cluster printing may be improved or optimized through the use of load balancing. Load balancing distributes print tasks among available printers according to the printers' capabilities. Faster printers may receive larger print tasks or more print tasks than slower printers in order to finish a print job in the less time overall. Printer capabilities and capacities may be used to determine the loads assigned to each printer.

Many computing device platforms and printing systems are available today and embodiments of the present invention may be implemented with many of these systems, however, due to the prevalence of the Microsoft Windows® operating system family, embodiments used in conjunction with Windows® systems will be used to illustrate its functions. Accordingly, details of Microsoft Windows 95® and related Microsoft Windows® printing processes will be explained.

Microsoft Windows® operating systems typically employ two file types in the printing process. These file types are Enhanced Metafile (EMF) and raw format (raw) files.

Raw format files are device dependent files that are destined and formatted for a specific device. An example of a raw file is an encapsulated Postscript file, which is formatted to be interpreted by a Postscript printer. EMF files are device independent files that contain graphic device interface (GDI) function calls that reproduce an application's graphic objects on a printer. EMF files are used to quickly record a printed document and return system control to a user. After control is returned to the user, the function calls stored in the EMF file may be executed and sent to the printer in the background.

Files may be recorded for later play back by using a spool file that is written and later de-spooled to a printing device. Spool files may be used for EMF and raw files. However, a print job may also be written directly to a printing device without using a spool file. Some typical printing process scenarios using raw spool files and EMF spool files are described below to introduce the elements and relationships of these processes and how they relate to embodiments of the present invention. These scenarios are derived from information contained in the Microsoft Windows 95® Driver Development Kit (DDK) documentation, the Microsoft Windows 2000® (DDK documentation and the Microsoft Windows NT® DDK documentation, incorporated herein by reference.

A typical printing process scenario using a raw spool file may be described in reference to FIG. 1 wherein an application 10 initiates a print request 1 by calling a graphic device interface (GDI) 12. Application 10 may be a word processor, spreadsheet, browser, database program or some other program that runs on the underlying operating system. Typically, application 10 will create a device context (DC) and draw an object (i.e., a circle, a line, etc.) to the DC. The application 10 will then call the GDI with a print request directed to a particular printer 16 (FIG. 2) using that DC.

The GDI 12 will call the printer driver 14 associated with the particular printer 16 and request 2 instructions on how to render the object on that particular printer 16. The printer driver 14 will return 3 the instructions on how to render the object on the printer 16. In Windows 95®, used in this printing process example, the printer driver 14 is written in 16-bit code and communicates with a 16-bit GDI 12. This GDI will then pass the print request to a 32-bit GDI (GDI32) 18 to handle the 32-bit Windows 95® spooler process. GDI32 makes an inter-process call 5 to the spooler process 20.

Spooler process 20 calls 6 the router 22 to route the print job to printer 16. In this example, illustrated in FIGS. 1-2, the router 22 sends the print job to a local print provider 24. In other scenarios, the router 22 may send print jobs to a network printer through a network print provider (not shown). When the default Windows 95® spooler is used, network print jobs are spooled and de-spooled on the client machine just as local print jobs. The network print server is contacted only during despooling. Windows NT/2000® client machines handle print jobs to network print servers differently, these machines use remote procedure calls (RPCs) to call the necessary printing application program interfaces (APIs) on the print server. In these NT/2000 scenarios, the print jobs do not show up on the local spooler queue, the print spooler on the print server handles spooling and de-spooling. This RPC method can be used in conjunction with Windows 95® spoolers also. Print jobs to locally connected printers or locally queued to (LPR) to network printers are handled similarly to Windows 95, 98 local print jobs.

In this local printing scenario, the router 22 calls the local print provider 24 with the print job. Local print provider 24 writes or "spools" 8 a raw spool file 26 to disk for later access. This is done to avoid waiting for the printer to complete the job before control is returned to the application. These steps from initiating the print request 1 to writing to spool file 26 may be repeated many times. Data may be appended to spool file 26 until an application signals that the print job is complete. This may be signaled with an EndDoc function. Local print provider 24 also starts 9 a background thread 28 that will determine the best time to start playing back or "despooling" the spool file 26 to the printer 16.

In reference to FIG. 2, Thread 28 monitors spooler subsystem resources to determine a good time to playback spool file 26. When thread 28 determines that playback should commence, a StartDoc function call 17 is sent to print processor 32 to start a new print processor thread 11. Print processor thread 11 invokes the local print provider 24 with a ReadPrinter function call to read part of the spool file 26. A print processor thread 19 also uses the local print provider 24 to invoke the language monitor 34 with a WritePrinter function call to send data through the physical port 38 connected with the bi-directional printer 16 specified previously.

For raw spool files, the default print processor 32 simply passes data through without changing or interpreting any of the information. A language monitor 34 is used in this example because the destination printer 16 is a bi-directional printer. When non-bi-directional printers are used a port monitor 36 would be invoked instead of the language monitor 34. A language monitor 34 and port monitor 36 may be separate components or may be integrated into one monitor.

Language monitor 34 calls 13 a port monitor 36 to send print job data to the printer 16. The port monitor 36 then sends 15 the raw data through the physical port 38 to the printer 16. This process of reading from a spool file 26 and forwarding data to the printer 16 may be repeated several times to complete a print job. This is typically repeated until an end-of-file is reached or the job is cancelled. The playback thread 19 is terminated at that point. The combination of spooler process, router, local print provider, print processor, language monitor and port monitor may be referred to collectively as a "spooler" 30.

When Windows Enhanced Metafile (EMF) format files are used in the printing process of Windows 9.x systems, process components interact differently than with raw files. An example printing process, shown in FIGS. 3 and 4 illustrates the printing process using EMF files.

This process typically commences when an application 40 creates a printer DC and draws an object to the DC (not shown). The application 40 then calls 41 GDI 50 with an EMF spooling request for a designated printer 68. GDI 50 queries 42 the printer driver 52 associated with the designated printer 68 to determine whether the driver 52 supports EMF spooling. If the driver 52 supports EMF spooling, GDI 50 changes the printer DC to an EMF DC and writes 43 the instructions for rendering the object to the EMF DC 54 (creates EMF files). GDI 50 then passes 44 the print request to the 32-bit GDI (GDI32) 56 because, in this example the Windows 95® spooler process is 32-bit code. GDI 32 subsequently makes an inter-process call 45 to the spooler subsystem 70 with a description of the print job.

The spooler process 58 (SPOOL32.EXE), in the spooler system 70, calls the router 60 to pass the print job description to the print provider 62 that can reach the designated printer 68. In this example, a local print provider 62 is used, but a network print provider may also be used. When the default Windows 95® spooler is used, network print jobs are spooled and de-spooled on the client machine just as local print jobs. The network print server is contacted only during despooling. Windows NT/2000® client machines handle print jobs to network print servers differently, these machines use remote procedure calls (RPCs) to call the necessary printing application program interfaces (APIs) on the print server. In these NT/2000 scenarios, the print jobs do not show up on the local spooler queue, spooling and despooling are handled by the print spooler on the print server. This RPC method can be used in conjunction with Windows 95® spoolers also.

When the router 60 has called the print provider 62, the local print provider 62 creates 48 a job description file 64 and adds 48 a record to the job description file 64 each time it is called for the job until all the EMF page files have been spooled and each EMF file name and location is recorded in the job description file 64. When information about the last EMF file in the print job has been recorded, the local print provider 62 will call the spooler process 58 with an EndDoc function call. This signals the spooler process 58 that the complete job is spooled and ready for despooling. For multipage jobs, these steps from initial spooling request 41 to job description file recording 48 are repeated for each page of a job.

When EMF file spooling is complete, the spooler process 58 sets a ReadyToPrint attribute on the print job and initiates an event 49 that signals to the port thread 66 that a job is available for printing. Port thread 66 responds to this event by determining the best time to start the despooling process and, at that time, loads 81 the print processor 72, as shown in FIG. 4. The print processor 72 will determine that the file format is EMF and call GDI32 56 with a Windows 95® function call 82.

GDI32 then invokes a gdiPlaySpoolStream function to read 83 from the job description file 64 that provides a fully qualified path to an EMF spool file 54. Through the job description file 64 that comprises a list of path names to EMF files, GDI32 knows about all the pages in the print job. The GDI32 gdiPlaySpoolStream function also calls GDI 50, using a thunk built into GDI32, with the path to the EMF spool file to render the page. GDI 50 only knows about one page in the print job at a time.

GDI 50 calls the printer driver 52 associated with the designated printer 68 chosen in application 40 and obtains a DC for the printer 68. GDI 50 then reads page-rendering instructions from the spooled EMF file 54 and passes 85 them one at a time to the printer driver 52 which uses as many instructions as are necessary to render the first part of the page. When the 16-bit printer driver 52 renders a part of the page, it passes 87 the printer-specific raw page data back to the GDI 50 which, in turn, passes 88 the raw data to GDI32 56. GDI32 56 then passes 89 the raw data to the spooler process 58 which then follows the same procedures it would for a raw format files as explained above.

Spooler process 58 calls 90 the router 60 to route the print job to printer 68. In this example, illustrated in FIGS. 3 and 4, the router 60 sends the print job to a local print provider 62. In other scenarios, the router 60 may send print jobs to a network printer through a network print provider (not shown). In this local printing scenario, the router 60 calls the local print provider 62 with the print job. Local print provider 62 invokes the language monitor 74 with a WritePrinter function call to send data through the physical port 78 connected with the bi-directional printer 68 specified previously.

A language monitor 74 is used in this example because the destination printer 68 is a bi-directional printer. When non-bi-directional printers are used a port monitor 76 would be invoked instead of the language monitor 74. A language monitor 74 and port monitor 76 may be separate components or may be integrated into one monitor. Language monitor 74 calls 93 a port monitor 76 to send print job data to the printer 68. The port monitor 76 then sends 94 the raw data through the physical port 78 to the printer 68.

Parts of EMF pages are processed in this manner and printed until an entire page is printed. GDI32 56 then gets the path to the EMF spool file for the next page and calls GDI 50 to use the instructions in that EMF file to render the next page of the print job. The print job is finished when all the paths to EMF spool files are used up.

Other versions of the Microsoft Windows operating systems, such as Windows NT and 2000 may use different printing processes as described with reference to FIG. 5. These processes may be used to print data to local, network and remote printers either directly or through a network print server. EMF data may also be processed differently. For example, in Windows NT and 2000, the entire EMF data for all pages is passed to GdiPlayEMF( ) in one pass, rather than one page at a time. If the EMF data is to be queued on a print server, the EMF data is passed directly to the print server without rendering on the client. A mirror copy of the driver on the server renders the EMF data instead.

Typically, a user will employ an application 100 to create a print job by calling GDI 102 functions. The GDI 102 and/or application 100 will then call Winspool.drv 104, which is a client interface into the spooler. This client interface, Winspool.drv 104, exports the functions that make up the spooler's Win32® API and provides RPC stubs for accessing the server. The print job is then forwarded to the spooler's API server, Spoolsv.exe 106 that can be implemented as a Windows2000 service that is started when the operating system is started. This API server module exports an RPC interface to the server side of the spooler's Win32® API. This module implements some API functions, but most function calls are passed to a print provider by means of the router, spoolss.dll 108.

The router 108 determines which print provider to call, based on a printer name or handle supplied with each function call, and passes the function call to the correct provider 110, 112 or 114. If the selected printer is managed by the client system, the local print provider, localspl.dll 110, handles the print job. Printers managed by the local print provider 110 do not have to be physically local to the client, they may also be directly connected to network cards without using a server. When these printers are used, the print job is passed to the kernel-mode port driver stack 116 and on to the printer 118.

When printers located on a Windows NT/Windows 2000 server are selected, the router 108 directs the print job to the network print provider, Win32spl.dll 112. This network provider uses RPC to redirect calls from the client's router to the network server's spoolsv.exe process 124, which forwards the print job to the network server's router 126. Because the network printer is local to the print server system, the network server router 126 routes the job to the server's local print provider 128. The job is then directed to the server's kernel-mode port driver stack 130 and out to the selected network printer 132.

Remote printers may also be used with these systems. When a remote printer is selected, the client router 108 may direct the print job to the local print provider 110 which will forward the job to the kernel-mode port driver stack 116 and on to the remote printer 142 using a network protocol. When the local print provider 110 accesses a remote printer 142, the provider 110 uses a port monitor that can use network protocols recognized by the remote printer or its server.

Printers managed by non-Windows NT/2000 servers (e.g., Novell servers) may also be accessed through this print system. This may be achieved by using a local print provider 110 that directs the print job to the kernel-mode port driver stack 116 and on to the printer's server 136 using a type of network protocol. The server 136 then directs the job to the destination printer 140. This may also be achieved using a customized print provider 114 which sends the job to the kernel-mode port driver stack 116 which uses a network protocol to send the job on the printer's server 134 which then directs the job to the destination printer 138.

An example of these printing processes may be explained with reference to FIG. 6, which illustrates a Windows 2000 print process. In this process, an application 150 is used to create a print job with the Graphics Device Interface (GDI) 152. When the print job's initial output file is in raw format 154, the printer driver's printer graphics DLL 156 works in conjunction with the GDI 152 to create a print job that is sent to the client interface 160 of the spooler 190. Client interface 160 sends the job to the API server 162 which forwards the job to the router 164. In this example, the router 164, sends the job to the local print provider 165 as it is a local print job.

Within the local print provider 165, a print job creation API 168 is invoked. This API 168 accesses the printer driver's printer interface DLL 174 and creates a job spool file 176. The job creation API 168 also forwards job information to the job scheduling API 170 which initiates a job scheduler thread 172.

At this point, the file format is checked 178. If the initial job file is in a raw format already, the job is sent to the language monitor DLL 182 and on to the port monitor 184 which sends the job to the kernel-mode port driver stack 186. Port driver stack 186 sends the job to the selected printer 188 for final printing.

When an application 150 creates a print job with GDI 152 in EMF format, the job is sent 154 to a client spooler interface 160. Client interface 160 sends the job to the API server 162 which forwards the job to the router 164. Again, in this example, the router 164, sends the job to the local print provider 165 because the print job is local.

Within the local print provider 165, a print job creation API 168 is invoked. This API 168 accesses the printer driver's printer interface DLL 174 and creates a job spool file 176. The job creation API 168 also forwards job information to the job scheduling API 170, which initiates a job scheduler thread 172.

At this point, the file format is checked 178. If the initial job file is in EMF format, the job is sent to the print processor DLL 180 which directs the job back to GDI 152 for conversion to raw format with the help of printer interface DLL 174. The converted job is then sent back through the spooler client interface 160, API server 162 and router 164 to the print provider 165. In the local print provider, the job is processed by the print job creation API 168, job scheduling API 170 and job scheduler thread 172. Because the job is now in raw format, the job is sent to the language monitor DLL 182 and on to the port monitor DLL 184 and kernel-mode port driver stack 186 before arriving at the destination printer 188.

SUMMARY

Embodiments of the present invention comprise methods and systems that enable a user to distribute print tasks to a plurality of printing devices and automatically recover from errors. These methods and systems can be implemented without the use of additional hardware or server software for this purpose. These systems and methods are typically used in conjunction with a computer network comprising at least one computing device and a plurality of printing devices. When errors occur before, during the printing process or after spooling is complete, embodiments of the present invention may redirect or redistribute the print task to other printing devices to correct the error. Printing tasks which are typically sent to a single printing device may be distributed to alternative printing device(s) or multiple printing devices in cluster printing embodiments.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
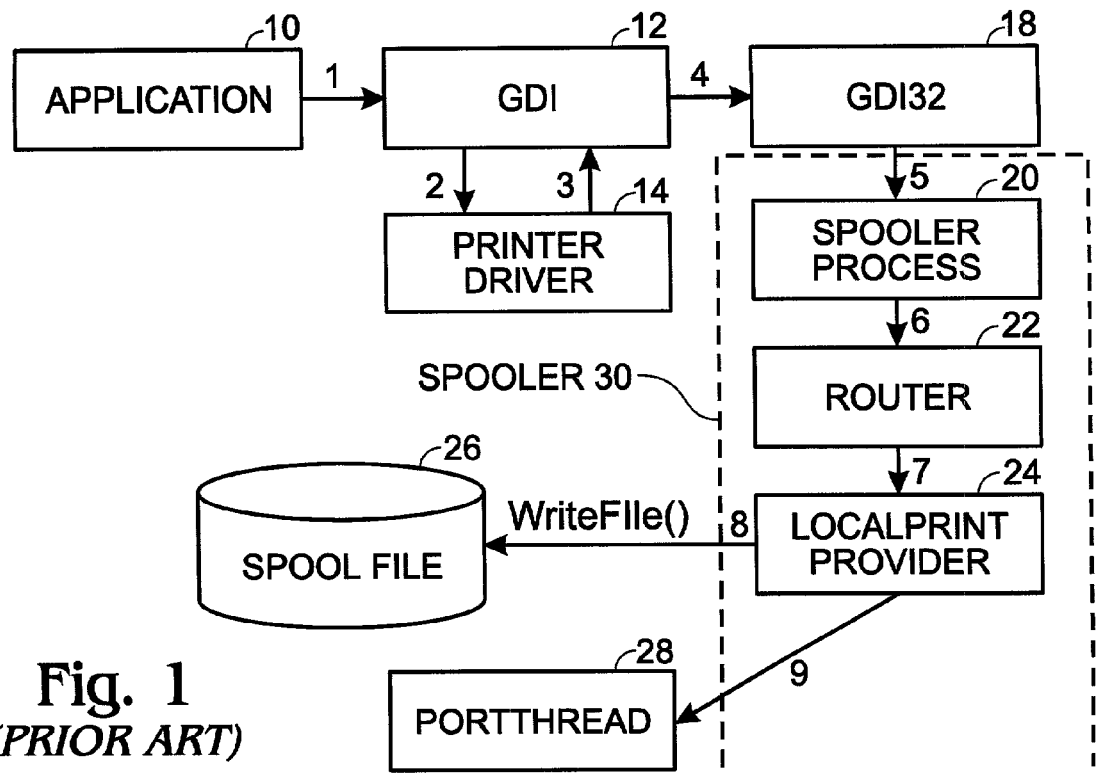
FIG. 1 is a diagram depicting a typical prior art printing process using a raw spool file.
Figure 2:
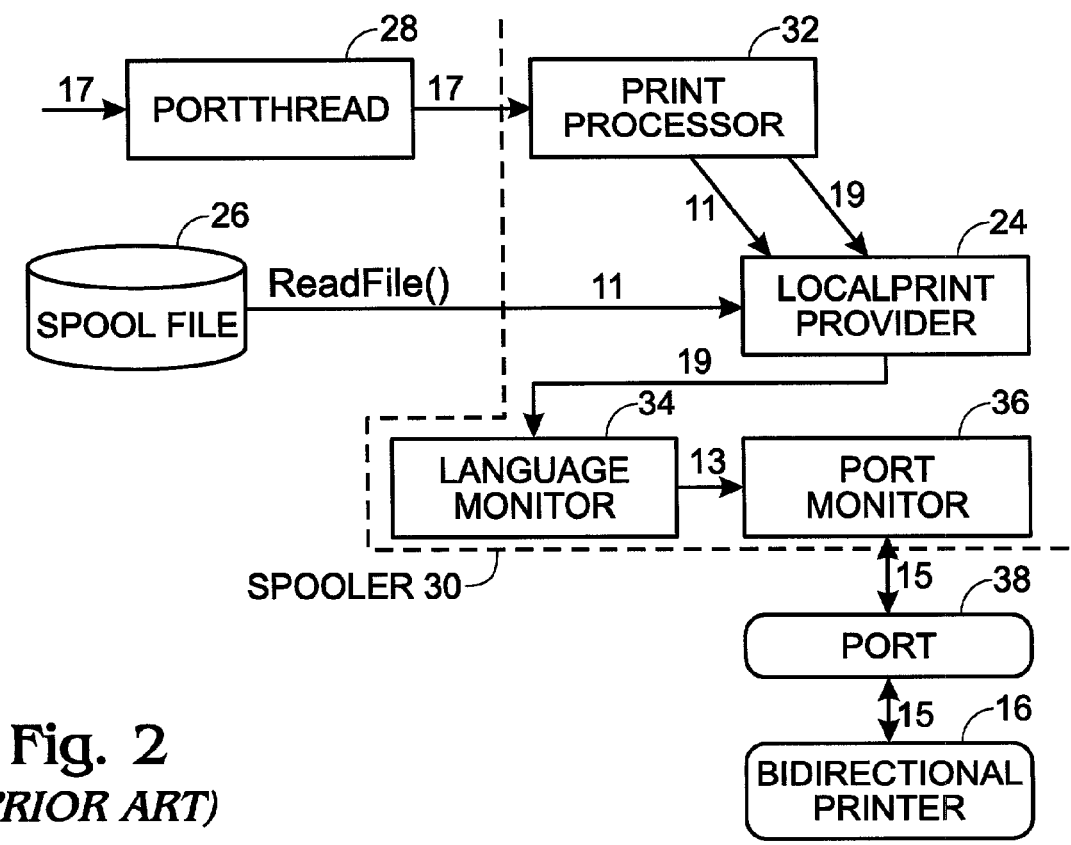
FIG. 2 is a diagram depicting a continuation of the typical prior art printing process using a raw spool file shown in FIG. 1.
Figure 3:
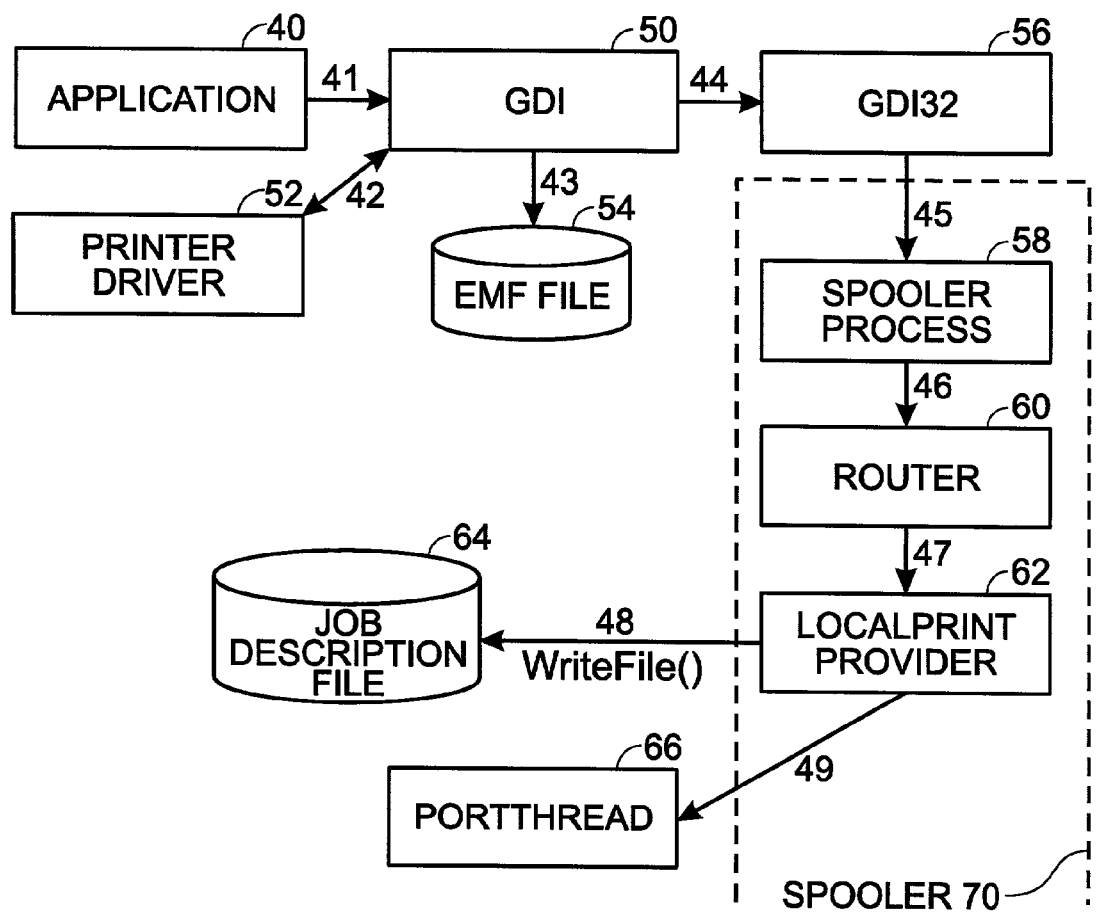
FIG. 3 is a diagram depicting a prior art printing process wherein EMF files are spooled.
Figure 4:
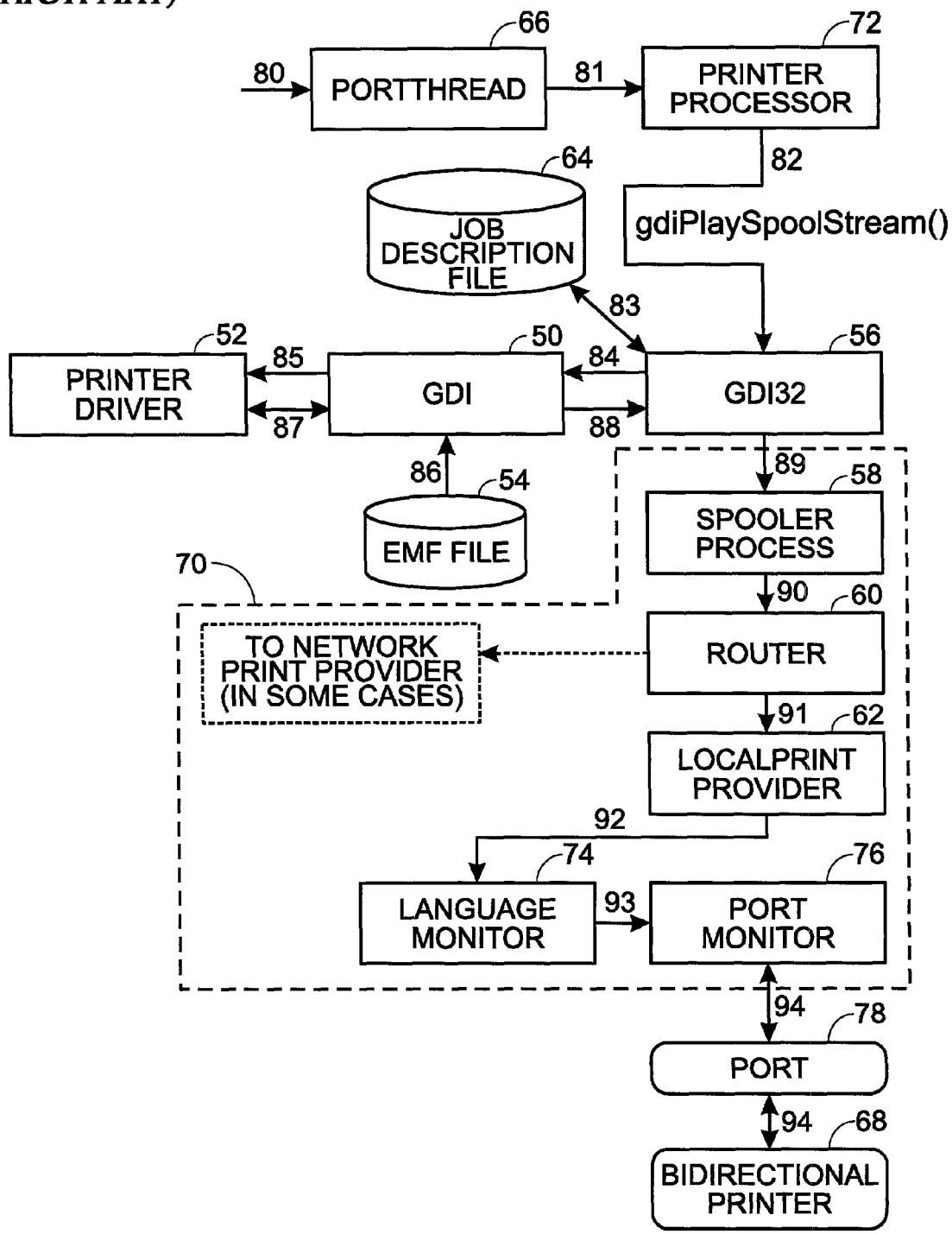
FIG. 4 is a diagram depicting a continuation of the typical prior art printing process wherein EMF files are de-spooled.
Figure 5:
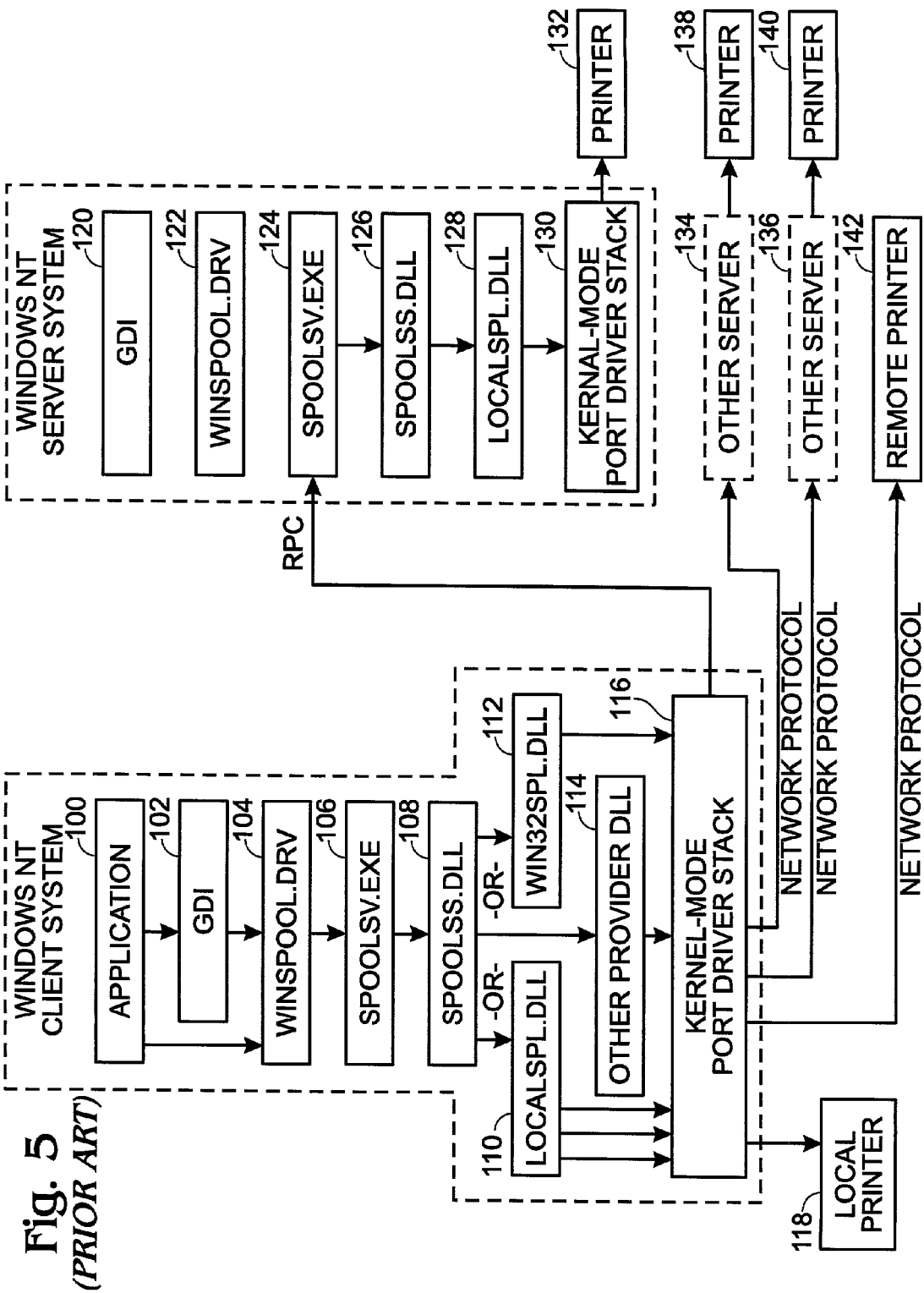
FIG. 5 is a diagram depicting a prior art printing process used in a Microsoft Windows NT/2000 operating system.
Figure 6:
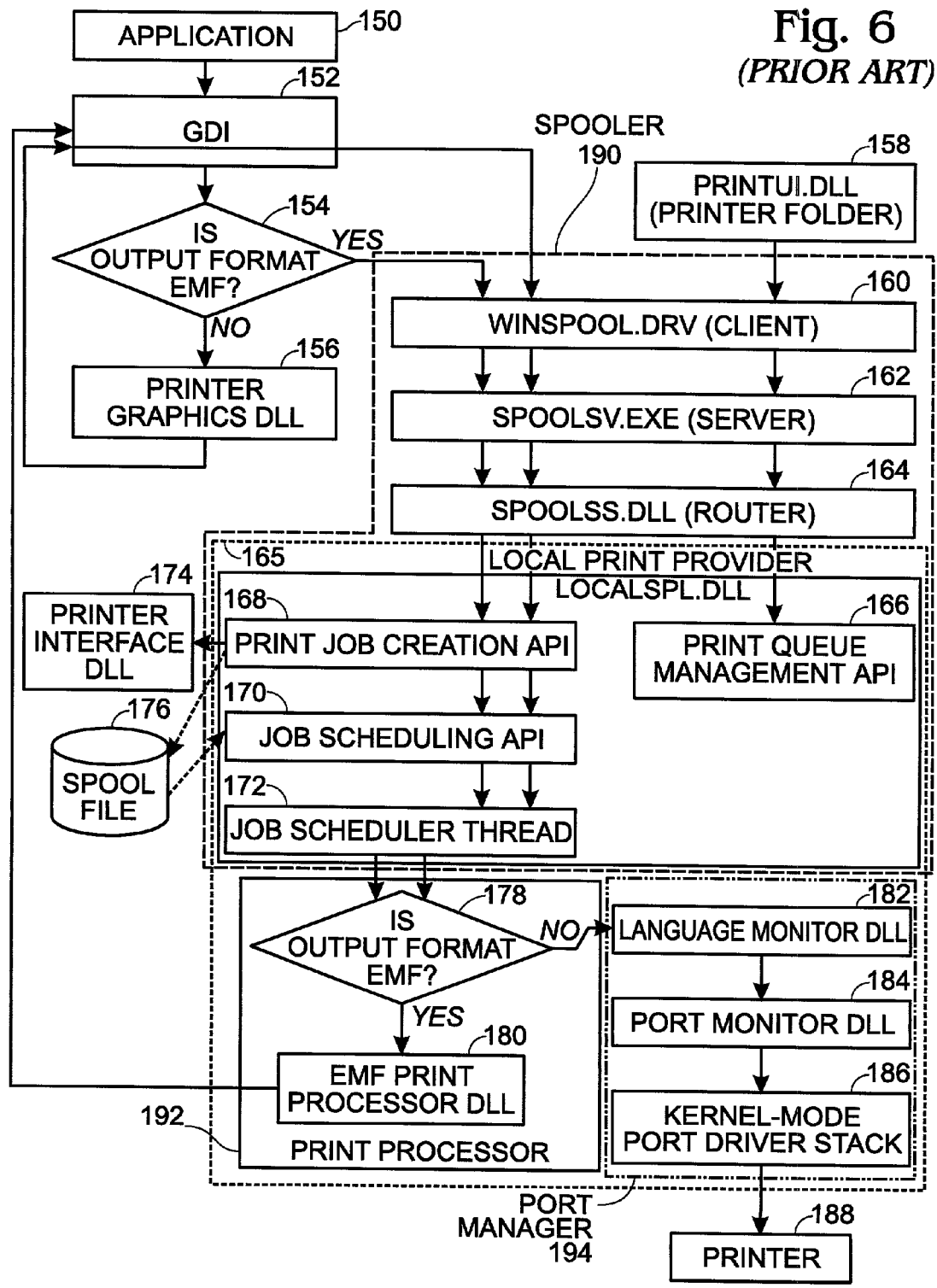
FIG. 6 is a diagram depicting the prior art printing process used in a Microsoft Windows NT/2000 operating system shown in FIG. 5.

The figures listed above are expressly incorporated as part of this detailed description. It will be readily understood that the components of the present invention, as generally described and illustrated in the figures herein, could be arranged and designed in a wide variety of different configurations. Thus, the following more detailed description of the embodiments of the systems and methods of the present invention, as represented in FIGS. 1 through 25 is not intended to limit the scope of the invention, as claimed, but is merely representative of the presently preferred embodiments of the invention. Some embodiments of the present invention will be best understood by reference to the drawings, wherein like parts are designated by like numerals throughout.

To simplify discussion of a printing system some groups of system components may be referred to collectively. A group of components comprising a spooler client interface 160, spooler API server 162, router 164, print job creation API 168 and job scheduling API may be referred to as a spooler 190 in a Windows NT/2000 operating system. A group of components comprising a language monitor 182, port monitor 184 and port driver stack 186 may be referred to as a port manager 194. A group of components comprising a file format director 178 and EMF print processor DLL 180 may be referred to as a print processor 192. Equivalent component groups may be referred to by these terms also whether in a Microsoft operating system or another system.

The systems and methods of embodiments of the present invention typically operate within a system comprising one or more printers connected together in a common network environment (locally connected, remotely connected through network print queue or combinations thereof), a computing device capable of spooling a print job, and a printer driver and print processor compatible with the printing devices, such as in the Microsoft Windows 9x, NT, 2000 and XP operating systems.

Embodiments of the present invention which utilize a Microsoft Windows® operating system generally comprise a printer driver, spooler, print processor and other print system components which process print tasks generated through the operating system and applications running on the operating system. Embodiments used in conjunction with other operating systems will utilize similar processing elements.

Exemplary embodiments of the present invention will be described with terminology related to a Microsoft Windows® environment, however these terms shall relate to equivalent elements in other operating systems. For example, the print processor described in many embodiments will relate to a print processor common in the Windows® environment as well as elements with equivalent functions in other operating systems.

The definitions in this and subsequent paragraphs apply throughout this specification and related claims. The term "print job" may refer to any combination of data that can be printed. A print job may comprise text and/or graphics and may comprise part of a page, a single page or many pages. Print jobs may be rendered or un-rendered. Generally, a print job is generated by an application, such as a word processor, spread sheet, etc., however, a print job may also comprise a file or data in memory that may be sent directly to a print process.

The term "print copy" or "copy" may refer to data, code or commands which generate a single printing device output of a print job or may refer to the actual hard copy output of the print job.

The term "print task" may comprise any combination of print jobs and copies thereof. A print task may comprise one or more print jobs and one or more copies of each print job.

The term "copy splitting" may refer to a process by which a print task comprising multiple copies is divided into multiple modified print tasks with each modified print task comprising a portion of the total number of copies.

The term "job splitting" may refer to a process by which a print task comprising at least one print job is split into multiple modified print tasks with each modified print task comprising a portion of a print job.

The term "network" may refer to any combination of computing devices and peripherals, such as printing devices, wherein the devices can communicate with each other. The term "network" may comprise Local Area Networks (LANs), Wide Area Networks (WANs) and many other network types. A network may be connected using conventional conductive cable, fiber-optic cable, phone line cable, power line cable or other electrical and light conductors and other signal transmission media as well as wireless connections using infrared, RF or other wireless methods References to a Microsoft Windows or Windows operating system may refer to any version or variation of a Microsoft Windows operating system comprising Windows 95, Windows 98, Windows NT, Windows 2000, Windows ME, Windows XP and others. While exemplary embodiments of the present invention may be directed to a Windows operating system and environment, systems and methods directed to other operating systems such as Macintosh, UNIX, DOS, Linux, MVS and others are to be contemplated within the scope of the present invention.

Embodiments of the present invention may be embodied in software, firmware, hardware and other forms that achieve the function described herein. As embodiments of the present invention may be adapted to many environments with varying computing devices, operating systems, printing devices, network hardware and software, applications and other variables, these embodiments may take many forms to achieve their function. Some embodiments may also be transmitted as signals, for example, and not by way of limitation, embodiments may be transmitted as analog or digital electrical signals or as light in a fiber-optic line. All of these embodiments are to be considered within the scope of the present invention.

Embodiments of the present invention may be used to achieve printing device status detection and analysis, print task modification, copy splitting, job splitting, error detection, error correction, print task redirection, print task redistribution and various combinations of these concepts along with related distribution tasks that allow modified or unmodified print tasks to be distributed to one or more printing devices. In some embodiments, printer status and printer capabilities are detected and analyzed to determine a print task destination or modified print task destination. In other embodiments, printer status and printer capabilities may be used to modify a print task to print on a specific printer.

Figure 7:
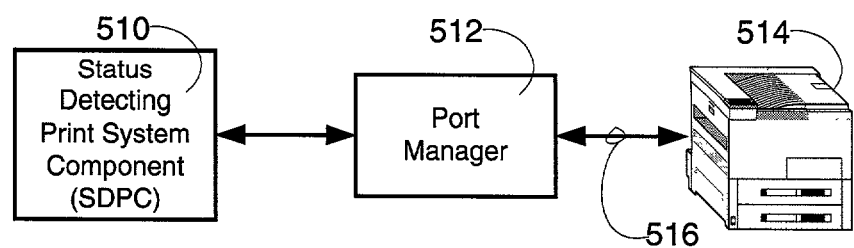
FIG. 7 is a diagram depicting an embodiment of the present invention used in conjunction with a local printer.
Figure 8:
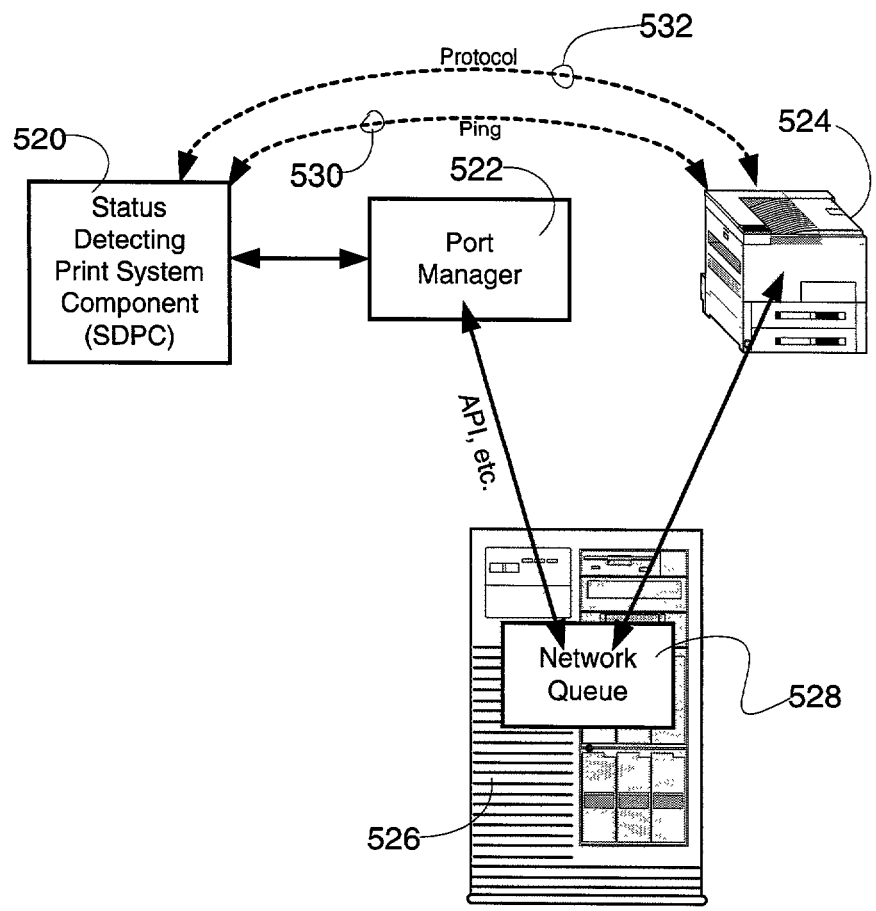
FIG. 8 is a diagram depicting an embodiment of the present invention used in conjunction with a network printer.

Some embodiments of the present invention may detect the status of a local printing device. A local printing device is a printing device that is directly connected to a communications port on a computing device and which is being used by a user of that computing device. For example, and not by way of limitation, a printer connected to a USB port, a parallel port or a serial port on a desktop computer is a local printer when it is being used by that computer. When a local printer is used, as shown in FIG. 7, a status detecting print system component (SDPC) 510 of the present invention may be used to detect the status of the local printer. This may be done by querying a port manager 512 which can access information about the devices connected to the various ports on a computer. The port manager 512 can communicate with the devices connected to its ports and determine their status. In some cases, a bi-directional communication 516 may be established between a port manager 512 and a printing device 514. This communication is generally carried out using a printing or communication protocol. PDL instruction may be used when supported by a PDL and PDL interpreter. Using this protocol or a similar process, a printing device status may be determined by the port manager 512 and communicated back to the SDPC 510. In this way, a port manager may typically determine printing device status such as conditions where a printing device is offline, idle, ready to print, waiting to print, busy, printing, job interrupted, job cleared or in an error state. The number of jobs to print, estimated time to print, estimated time to print job completion, number of pages printed and other information may also be obtained. Other status conditions may also be determined according to the capabilities and limitations of the port manager, printing/communications protocol, printing device, operating system and other factors. Depending on these factors, an estimated time to current job completion, printer speeds (i.e., ppm), particular error state details and other status details and printer capabilities may also be determined.

Embodiments of the present invention may also be used to detect printing device status on network printing devices. This may be done in several ways. Some of these methods are described in reference to FIG. 8. A status detecting print system component (SDPC) 520 may communicate with a port manager 522 and access information regarding devices connected to its ports. In a network environment, a port manager 522 may communicate with a print server 526 and obtain information about a network print queue 528. A port manager 522 may use an application program interface (API) to communicate with the print server 526 and obtain network queue 528 information. As a non-limiting example, in a Microsoft Windows environment the "(GetPrinter)" call may be used to obtain printer queue 528 information. Printer queue 528 information may comprise the number and names of print jobs in the queue, which may be used to determine if the associated printer 524 is busy or idle.

A SDPC 520 may also communicate directly with a network printer 524 by pinging 530 the printer 524 to determine its status. A ping may take the form of a "request to respond" sent to a printing device. If a printer 524 responds to the ping 530, the SDPC may determine that the printer 524 is online in a ready to print or busy state or offline in an error state. If a printer 524 does not respond to a ping 530, the SDPC may determine that the printer 524 is offline.

In embodiments which employ a TCP/IP protocol, a SDPC 520 may send a request to the IP address of each printer on a network. The IP address may be obtained in a variety of ways including lookup in a Domain Name Service (DNS) server, a database, port name, manual entry by a user or administrator or other methods. A timeout period and maximum number of retries may be specified. If a printer does not respond within the timeout period and within the maximum number of retries, the printer may be classified as offline. These methods may be used for remote printers as well.

Some embodiments of the present invention may also comprise a SDPC 520 that employs a communication protocol 532 to communicate directly with a network printing device 524. These protocols may comprise the Simple Network Management Protocol (SNMP), the Internet Printing Protocol (IPP) and other protocols and communication methods. A SDPC 520 may use the Simple Network Management Protocol (SNMP) to send protocol data units (PDUs) to network devices and gather information from device Management Information Bases (MIBs) to determine device status. Standard, extended and job MIBs may be obtained. Using this technique, a SDPC 520 may determine if a printing device is offline, busy, ready to print, in an error state and other status information. When a printing device 524 is busy, more detail can be obtained such as print job identification, job size, estimated time to completion and other details. When a printing device 524 is ready, more detail may also be obtained such as whether the printing device 524 is idle (cool) or warm. A newer remote monitoring protocol (RMON) may also be used to determine printing device status. RMON embodiments utilize additional MIBs beyond those established for SNMP protocols. In addition to printing device information, RMON embodiments may also gather network traffic data to further refine a device's status. Other embodiments may comprise an Internet Printing Protocol (IPP), Bluetooth® SDP and HTTP servers. These protocols and similar methods may also be used for remote printing devices.

Using SNMP, IPP or other protocols, embodiments of the present invention may use a "request for printer status" query to find printing device status information. Some embodiments may also wait for an interrupt from a printing device. With SNMP, for example, a SDPC 520 can receive updated status data on a print job from each printer's MIBs. This date can be used to classify a print job as: waiting to print, estimated time to print, printing, estimated time to print job completion, number of pages printed, print job completed, error state, job interrupted, job cleared and others.

Printing device information may also be obtained for network and remote printers using a TCP/IP protocol with an "identify and respond" request that is broadcast over the network such as a local area network (LAN). In response, each device would send its IP address and device type. If the device type is a printing device, the device can be classified as online.

Figure 9:
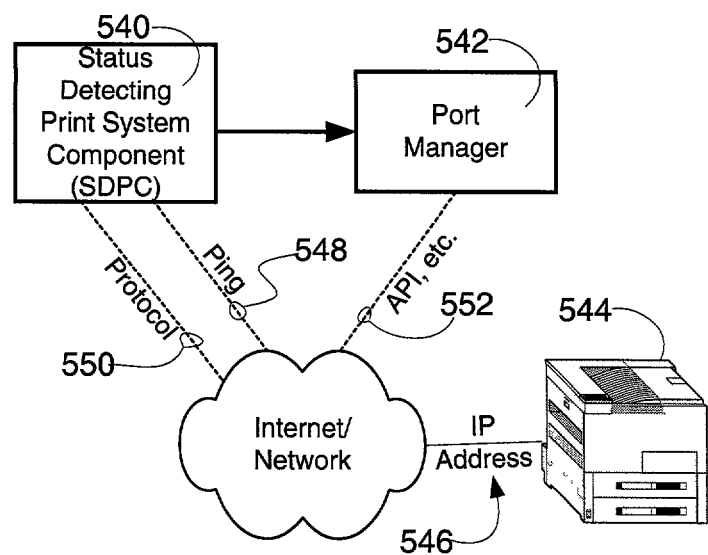
FIG. 9 is a diagram depicting an embodiment of the present invention used in conjunction with a remote printer.

Embodiments of the present invention may also detect the status of some remote printing devices as shown in FIG. 9. Remote printing devices 544 may be connected to a computing device at a location that is not directly connected to the computing device and that is not directly connected to the network of the computing device. These printing devices are generally connected through an Internet connection via an IP address 546.

The status of remote printing devices 544 may be detected by methods similar to those used for network printing devices. A SDPC 540 may ping 548 a remote printing device 544 directly via its IP address 546 and determine a ready or offline status based on a response or lack of response, respectively. A SDPC 540 may also utilize communications protocols 550 such as SNMP and RMON to communicate directly with a printing device 544 and access status information contained in the device's MIBs. These communications protocol methods may be used to determine if a printing device is offline, busy, ready to print, in an error state or other status information. When a printing device 544 is busy, more detail can be obtained such as print job identification, job size, estimated time to completion and other details. When a printing device 544 is ready, more detail may also be obtained such as whether the printing device 544 is idle (cool) or warm.

A SDPC 540 may also communicate 552 with a remote printing device 544 through a port manager 542. Through the port manager 542, an API may be used to communicate with the remote printing device 544 and ascertain the status of the printing device. In some embodiments, a Graphical Device Interface (GDI) API may be used to determine printing device status.

Figure 10:
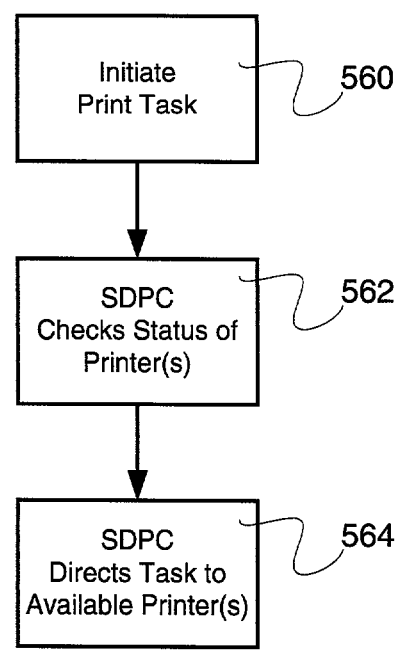
FIG. 10 is a diagram depicting an embodiment of the present invention comprising status checking and print task direction.

Some embodiments of the present invention, as shown diagrammatically in FIG. 10, enable a computing device to detect the status of printing devices and direct a print task according to device availability. Typically, a print task is initiated 560 from an application program, an operating system command or some other method. This initial procedure generally activates a print driver that may allow a user to select a print destination and format. A user generally selects a destination device that is appropriate for the desired task. The capabilities and limitations of this selected destination device may be used by these embodiments to determine compatible device parameters.

Once the task is defined by the driver, it may create a print task spool file which is sent to a spooler and other print system components as explained in relation to FIGS. 1-6. In these embodiments of the present invention, the spooler, or other print system components, may detect 562 the status of printing devices to determine their availability and capacity to perform a print task. When an available printing device is detected, the print system component may direct 564 the print task to the available device. This device to which the task is directed may be the device initially selected by a user, or another device selected by the print system component according to availability or some other parameter. The initially selected device may also be a virtual device.

Embodiments of the present invention may switch or redirect tasks between any printing devices that are compatible. Printing devices, such as printers, are generally compatible when they share the same Page Description Language (PDL) and have marking engines that share a similar geometric format. Other types of printing devices may be compatible when they share the same driver or description language.

Figure 11:
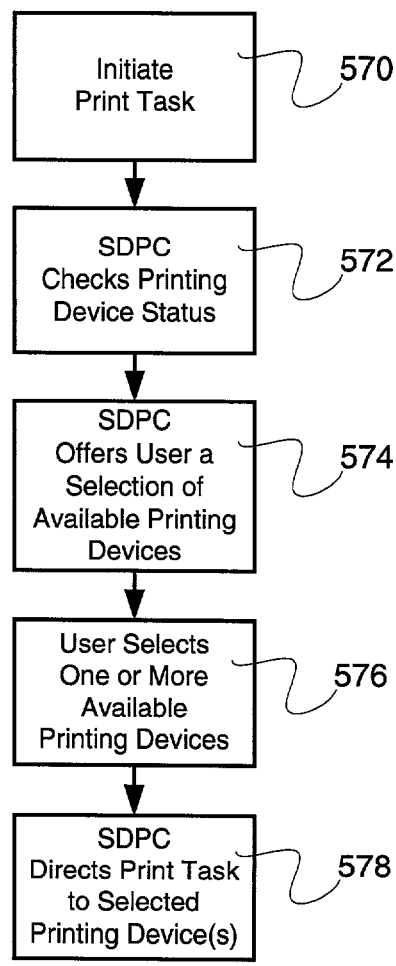
FIG. 11 is a diagram depicting an embodiment of the present invention comprising status checking and print task direction with user input.

Other embodiments of the present invention may employ a user interface to prompt for user selection of available devices as shown in FIG. 11. In these embodiments, a print task is initiated 570 and the task is transmitted through the necessary drivers, spoolers and other print system components and processes. A spooler or other print system component of embodiments of the present invention may, then, check 572 the status of printing devices in communication with it and compile a list of available printing devices. This list of available devices is presented 574 to a user and the user is prompted to make a selection among the available devices. Any form of user interface may be used to prompt the user, such as a dialog box, checkbox list or some other selection interface. The user selects 576 a preferred device in the case of a single device task or, in the case of a cluster printing task, a user may select a group of available devices. Once a device or devices has been selected, the inventive print system component of embodiments of the present invention directs 578 the print task to the selected printing device or devices.

Figure 12:
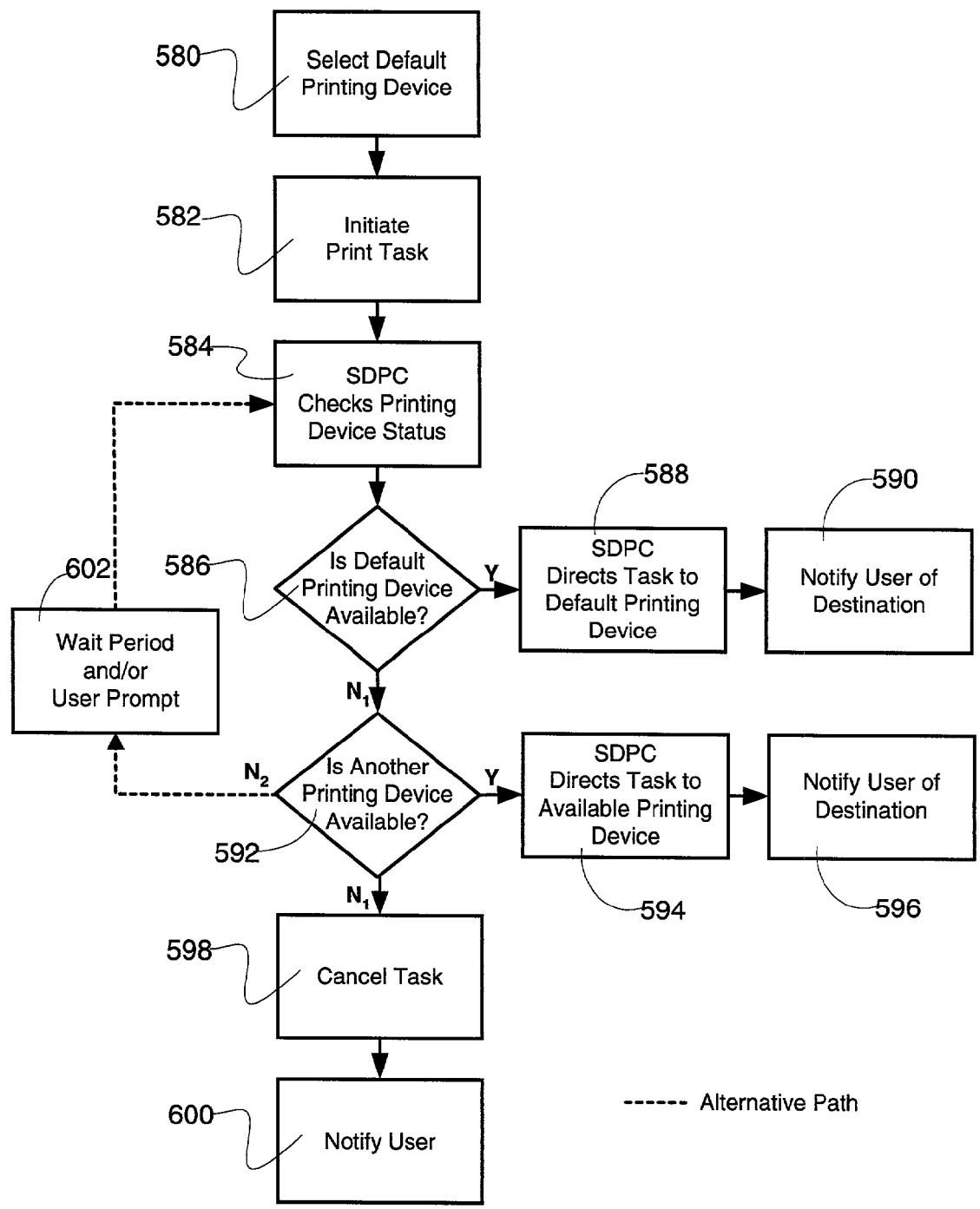
FIG. 12 is a diagram depicting an embodiment of the present invention comprising status checking and print task re-direction.

Further embodiments of the present invention may be used to accomplish a print task rollover process as illustrated in FIG. 12. A print rollover process is used to prevent print task delays when a default or preferred printer or printers are busy, offline or otherwise unavailable or unusable. In the print rollover process, a user generally selects a default printing device(s) 580 which may be stored according to many known methods. A user then initiates a print task 582. This can be done in a variety of ways including, but not limited to, selecting a print option in an application, running a batch file and others. Once the print task is initiated 582, or during initiation, a print driver is typically used to create a spool file that is sent through print system components to a spooler for spooling to other print system components and eventually on to a printing device. In embodiments of the present invention, a print system component may be a SDPC which checks the status 584 of printing devices that are in communication with the SDPC. These may be local, network or remote printing devices. Among these printing devices is the default printing device(s) previously selected 580. The SDPC of these embodiments checks 584 the status of the default printing device(s) and determines its availability. When the default printer is available 586, the print job is sent to the default printer 588 through typical printing channels. Once the print job has been sent, the SDPC or related code may notify 590 the user of the job destination. However, when the job is sent to the default printer 588, as expected by the user, notification 590 is optional.

When the default printer is not available 586, some embodiments may check the status and capabilities of other printing devices to determine if any of them are available 592. If another printing device is available and its capabilities match the print task or the print task can be modified to match the capabilities of the available printer, the print task may be "rolled over" 594 or directed to that available printing device instead of the default device. When this occurs, the user may be notified 596 of the new destination of the print task. If no printing devices are available 592, other options may be executed. In some embodiments, the print task may be cancelled 598 and the user may be notified 600 of the unsuccessful attempt. In other embodiments, shown as alternative paths in FIG. 6, the print processor may wait 602 for a period of time, suspend until re-initiated by the user or wait for some other event to occur after which it may again check the status of printing devices 584. If the default device or another device becomes available during the wait period, the print task may be directed to that device as if it were available before the wait period.

Figure 13:
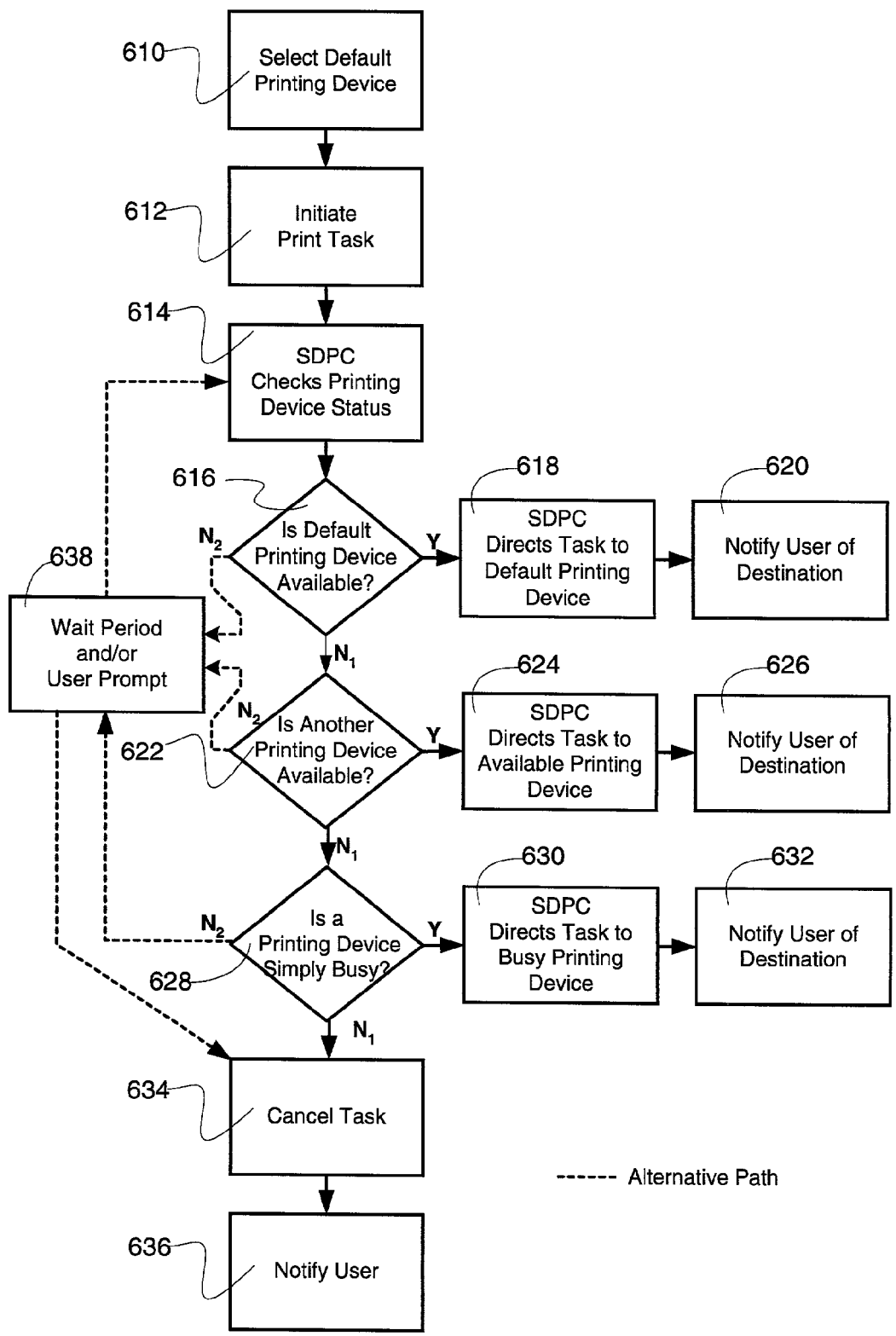
FIG. 13 is a diagram depicting an embodiment of the present invention comprising status checking and print task re-direction to a busy printer.

Other embodiments of the present invention, illustrated diagrammatically in FIG. 13, may consider printing devices in a busy state. In these embodiments, a default device is generally selected 610 at some time prior to initiating a print task 612. After print task initiation 612, a print task follows typical print processes via one or more spoolers, print processors and other print system components. When the task arrives at a print system component of embodiments of the present invention, such as a SDPC, the SDPC checks the status 614 of printing devices and determines whether the devices are available or busy. A status of available or busy may depend on several parameters, but typically, an available printing device will be idle with no print tasks in its queue or memory and a busy printing device will be printing with or without print tasks in its queue. The actual conditions defining a busy or available status may vary according to a user's needs. Variables such as the number of tasks in a print queue, task size, estimated time to completion and other factors may be used to determine a device status as available, busy or other states.

Once the status of devices has been determined, the SDPC determines whether the default printing device is available 616. If the default device is available, the SDPC will direct the print task to the default device 618. Optional notification to the user of the destination of the print task 620 may be performed. If the default device is not available, the SDPC may determine if other printing devices are available 622. If another printing device is available, the SDPC may direct the task 624 to the available device and notify the user of the task destination 626. Alternatively, the SDPC may wait for a period of time to allow the default device to become available or prompt the user for input 638.

When no printing devices are available 622, these embodiments may wait for a period of time and re-check device status or prompt a user for input 638. Embodiments may also determine if the unavailable printing devices are simply in a busy state 628. If a printing device is simply busy, the print job may be rolled over 630 to the busy printing device and the user notified 632 of the final destination of the print job. When no printing devices are available and none are busy, the print job may be cancelled 634 and the user notified 636 that no printing devices are currently responding. Alternatively to task cancellation 634, some embodiments may wait for a period of time 638 and re-check the status of the printing devices. After a wait period these embodiments may re-evaluate device status and direct the print task to any available or busy devices which have changed status during the wait period as displayed in FIG. 13. Other embodiments may prompt for user input 638 to determine whether a wait period is desired, to determine the duration of a wait period, to offer task cancellation options or some other user choice. A wait period or user prompt 638 may be activated from any step in the device status detection and task direction processes. For example, and not by way of limitation, a wait period or user prompt 638 may be activated when a default device is not available 616, when another device is not available 622, when a busy device cannot be found 628 or at some other point in these processes.

Figure 14:
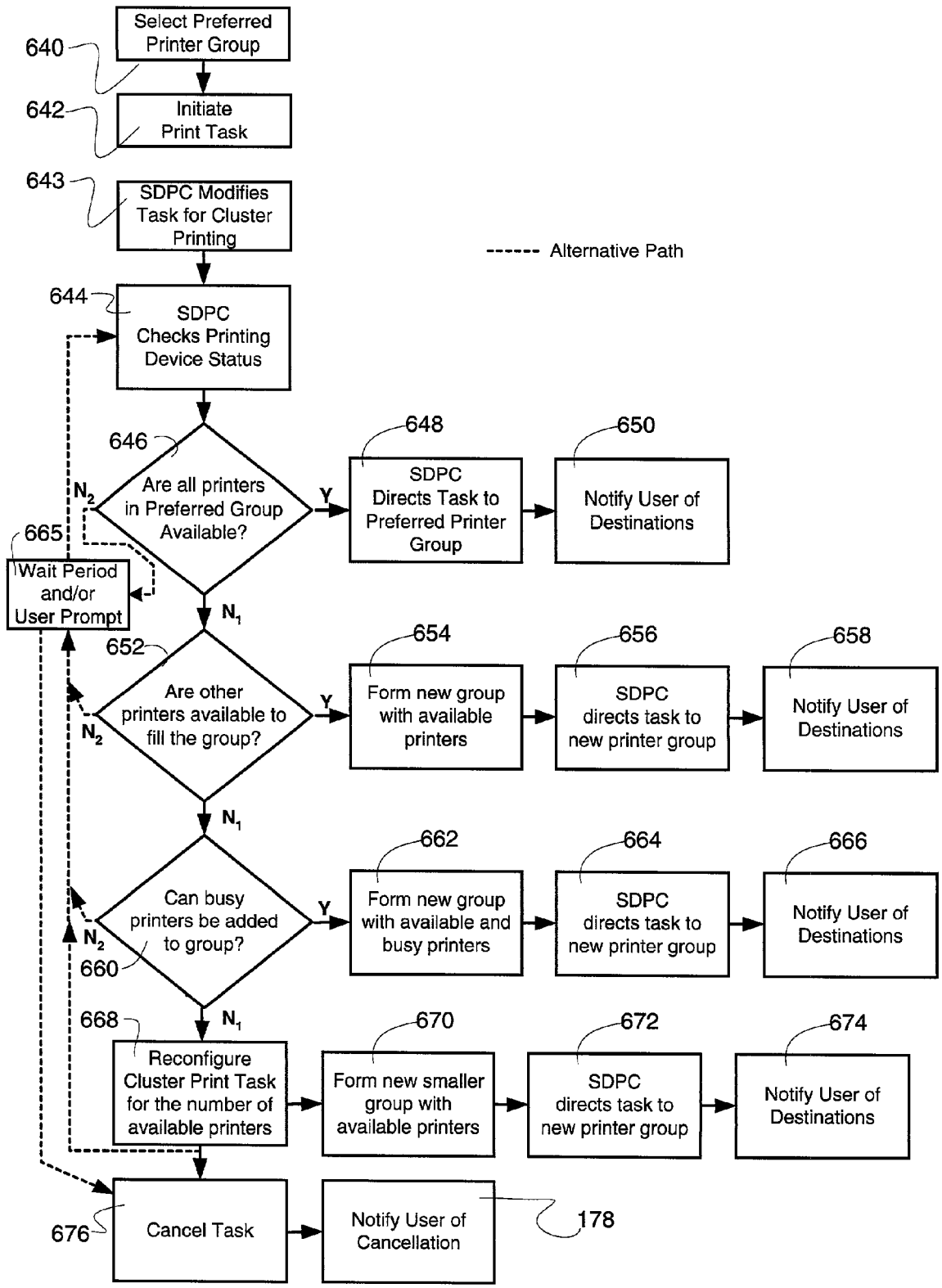
FIG. 14 is a diagram depicting an embodiment of the present invention comprising status checking and print task reconfiguration.
Figure 15:
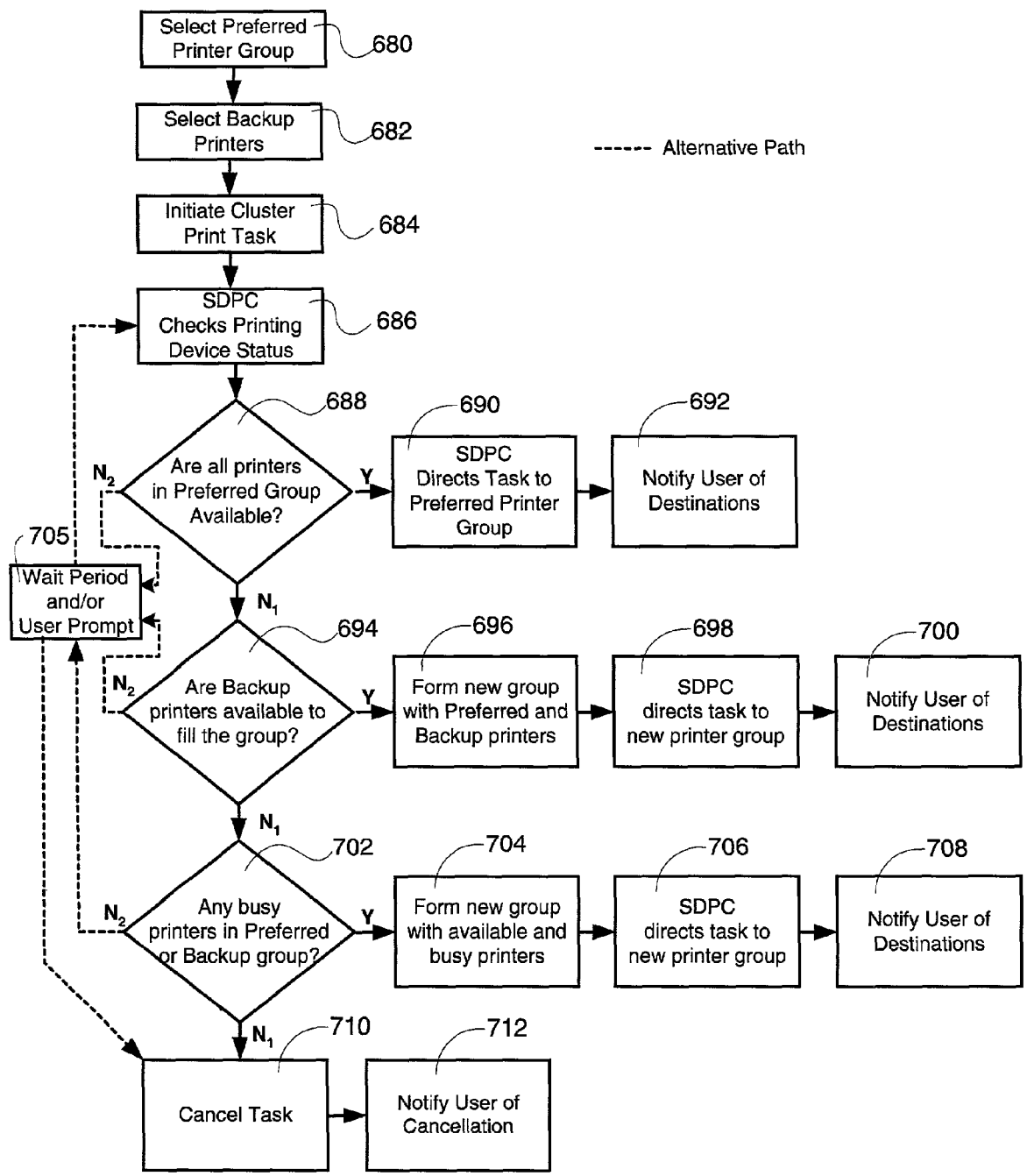
FIG. 15 is a diagram depicting an embodiment of the present invention comprising status checking and print task reconfiguration with cluster printers.

Some embodiments of the present invention are adapted for use in cluster printing environments as shown in FIG. 14. In these embodiments, a user may select one or more preferred printing devices 640 from a pool of printing devices in communication with the user's computing device. Preferred printing devices may be ranked in an order of preference, have no preference or a combination of ranked and non-ranked devices. These devices may also be ranked in multiple ways according to criteria such as speed, availability, location or other criteria. In some embodiments, a group of printers may be selected for cluster printing tasks as a preferred set of printers while one of these printers or another printer may be designated as a preferred printer for a single-printer task.

Once printers have been selected 640, a print task is initiated 642 in a typical manner as described above. When cluster printing options are desired, a cluster-enabled print system component (CPC) 643 of some embodiments of the present invention may modify a print task for cluster printing. Alternatively, a multiple-printer task configured without a CPC may be directed to a status-detecting print system component (SDPC) for error correction, redirection, redistribution and other functions.

When a SDPC of embodiments of the present invention receives a print task or set of print tasks, the SDPC may check the status 644 of printing devices in communication with it. When, in this example, a multiple-printer task or cluster print task is sent to the SDPC, the SDPC will check whether all printers in the preferred group are available 646. If all the preferred printers are available 646, the SDPC will direct the print tasks or modified print tasks to the preferred printers 648 and may notify the user of the task destinations 650.

If all the preferred printers are not available 646, the SDPC may prompt for user input or wait for a period of time for printers to become available 665. Alternatively, the SDPC may check to see if other printers are available 652. If a sufficient number of other printers are available to make up for the lack of preferred printers, a new group 654 may be formed to which the print tasks may be directed 656 by the SDPC. When print tasks are redirected in this manner, a user may be notified 658 of the final destination of each print task or modified print task.

When a sufficient number of printers are not available to match the number in the preferred group 652, a SDPC may prompt for user input or wait for printers to become available 665. A SDPC may also form a group of printers with fewer or more printers than the preferred group based on various criteria such as the total PPM or some other criteria.

Alternatively, a SDPC may check for busy printers 660. These may be printers which are printing at the time of the status check, printers which will be available within a given time period, printers which have only a given number of jobs in their queue or printers in some other situation that would indicate they will soon be available. Many algorithms may be used to determine a busy status. As a non-limiting example, the maximum time to complete the current load or queue combined with a printer's estimated time to start or load a task. If enough busy printers are found such that when combined with all available printers they are as numerous as or otherwise meet some criteria similar to the preferred printer group, a new group will be formed 662 with the busy and available printers and the SDPC will direct the print tasks to this group 664. A user may again be notified 666 of the final destination of the print tasks.

If a sufficient number of available and busy printers cannot be found to make up a group equal in size to the initial preferred printer group 660 or otherwise match a sufficient number of printers based on other criteria, the initial print task may be reconfigured as a cluster print task that requires fewer printers, such as the number of available printers 668 or the number of available and busy printers combined. When this reconfiguration can be performed, a new smaller group of printers is formed 670 and the SDPC directs the new modified print tasks to printers in this new printer group 672. Again, users may be notified of the destination and configuration of the final modified print tasks 674. Alternative to print task reconfiguration 668, a SDPC may prompt for user input or wait for printer status changes 665.

When a sufficient number of printers is simply not available or otherwise unusable, a print task may be cancelled 676 and the user notified 678 of the cancellation and printers' status. Alternatively or additionally, a wait period or user prompt 665 may be added to these processes. A wait period or user prompt may be activated from any point in these processes in order to allow user input to decision-making processes and to allow devices to become available or otherwise change status when a current situation is unacceptable. After a wait period, the initial task or tasks may be re-initialized and printer status checking may begin anew as in some above-described embodiments. A user may also select task cancellation from a user prompt.

When the number of printers in a network is large and the printers are geographically diverse, a user may want to limit the printers accessed by the SDPC to one or more select groups. Other reasons may also motivate a user to limit accessible printers. Some embodiments of the present invention may accommodate these needs. In some embodiments, illustrated in FIG. 15, a user may select a preferred group of printers 680 to which print tasks will be sent when they are available. Further, a user may select a group of backup printers 682 which may be substituted into the preferred group when printers in that group are not available, busy or otherwise unusable. Preferred and backup printing devices may be ranked in order of preference in some embodiments. Optionally, a user may designate printing devices which should not be used as preferred 680 or backup 682 printing devices thereby eliminating them from consideration by the SDPC. These selection processes allow a user to eliminate printing devices from consideration which are not acceptable to a user by virtue of their location, capability or some other reason.

Once preferred and backup printers have been selected, a user may initiate a cluster printing task or multiple-printer task 684, which is sent to a SDPC of embodiments of the present invention. This may be done through a CPC or my other means. In some embodiments, a CPC may be integrated with a SDPC to perform both cluster-enabling functions and status detection functions. The SDPC, upon receiving task or group of tasks, checks the status of printers in the preferred and backup printer groups 686. If all printers in the preferred group are available 688, the SDPC will direct the print tasks to the preferred group 690 and notify the user of the tasks' destinations.

When some of the preferred printers are not available 688, the SDPC may determine whether backup printers are available 694. If backup printers are available 694, they may be added to the preferred printers, which are available to form a new group of available printers 696. The SDPC will then direct the print tasks to this new printer group 698 and notify the user of the destination of the print tasks 700. In an alternative embodiment, a user prompt or wait period may be activated when preferred printers are not available 705. In some embodiments, the SDPC may also check the capabilities of the printers and determine whether they have the capability to print the print job along with printer availability.

When enough backup printers are not available to fill out the preferred group 694, a SDPC may prompt for user input or wait for a change in printer status 705. Alternatively, the SDPC may add any busy printers in the preferred group 702 until the number of printers equals the number of preferred printers or the number of printers required for the particular task or tasks. If the addition of busy printers to a group creates a group of sufficient size, a new group is formed 704 and the SDPC may direct the print task or tasks to this new group 706. As in other embodiments, a user may be notified of task destinations and modifications 708.

If a sufficient number of available or busy printers cannot be found 702, a task may be cancelled 710, and the user notified of the cancellation 712. Alternatively, a SDPC may prompt for user input or enter a wait period 705 and restart the status checking process after a period of time. As an additional alternative to cancellation 710, the SDPC may reconfigure a task or tasks for output on a smaller number of printers as described in relation to FIG. 14.

As in some above-described embodiments, a wait period or user prompt 705 may be utilized in these embodiments and many others to allow devices to become available or otherwise change status or to solicit user input at different points in these processes. Once status changes are detected or user input is accepted 705, embodiments of the present invention may reenter the steps illustrated in these flowcharts and equivalents at many points 584, 586, 592, 598, 614, 616, 622, 628, 634, 644, 646, 652, 660, 668, 676, 686, 688, 694, 702 or 710 in the process.

The methods and systems shown in FIGS. 7-15 are illustrative of exemplary embodiments of the present invention. Other embodiments may be derived through omission and addition of the illustrated steps and their equivalents.

Error Detection

Typically, when a print task is initiated, either through an application, through an operating system command or by some other means, a user will specify one or more printing devices to which the print task or tasks will be sent. This may be performed through a driver dialog process or by other means. The print task or tasks will then proceed through the driver, spooler, print processor and other print system components. Prior to spooling data to a printing device, print system components may check the status of printing devices in communication with the print system components and their host computing device. If any of the devices selected by a user are not available and/or simply busy, the tasks which were initially designated for those devices are "rolled over," redirected or redistributed to one or more other devices that are available.

Once a print task has begun despooling to the printing devices errors may occur. During print task despooling, embodiments of the present invention may detect printing device status or despooling status of the print tasks. If errors are detected, a print task, or unprinted portions thereof, may be redirected or redistributed to another device or devices which are available or otherwise usable for the print task. As a non-limiting example, embodiments may detect whether a successful write/playback to a local printer port, remote printer or a network print queue has occurred or whether despooling by a network print queue or marking and finishing by a print engine have occurred.

The systems of some embodiments of the present invention comprise a plurality of compatible printers. Compatible printers are printers that share the same Page Description Language (PDL) and have marking engines that share a similar geometric format. Other types of printing devices may be compatible when they share the same driver or description language. Still others may be compatible when they share different elements of the print task, such as color/black-and-white separation. These printers are generally connected together in a common network environment. These systems also comprise a computing device capable of spooling a print job (spooler), a printer driver, a print processor and other print system components that are compatible with the printing devices. These embodiments may also comprise a Microsoft Windows® 9x, NT, 2k, XP or similar operating system.

Using these systems, a user generally initiates a print task, comprising one or more print jobs. A print job may be a document or portion of a document with each document comprising one or more pages. A print task may also comprise one or more copies of a print job. A print task may be pre-processed into printer ready data, such as an application rendering its output into a Page Description Language (PDL), such as PCL, Postscript, PDF, TIFF or others. A print task may also be rasterized (RIP). A print task may also be journaled, where the rendering instructions are recorded, and the playback of the rendering instructions is deferred, such as Enhanced Meta File (EMF, Microsoft Corp) and Printer Meta File (PMF, Sharp Corp) or others.

Upon initiation of the print task, the user selects a command, sequence of commands or some other stimulus to communicate to a computing device that the user intends to spool a print job. A computing device responds to the user by presenting the user a dialog, such as a Printer UI, command line query, front panel display or other prompt, in which the user can select options relating to the spooling of the print job. One of the options may be the selection of the printing device or devices to which a print task may be transmitted. A printing device may comprise a printer, plotter, Multi-Function Peripheral (MFP), CD burner or other device that generates a copy.

Once the printing device(s) are selected, the computing device responds by loading the device driver and print processor associated with the printing device(s). The device driver responds, automatically or by user initiation, to the user by presenting the user a dialog, in which the user can select options relating to the printing device's capabilities. These device capabilities may comprise print quality, paper size, orientation, tray selection, manual feed, stapling, watermarks and other options.

In these systems, a dialog presented to the user for selecting options specific to the printing device's capabilities may comprise a dialog related to cluster printing. Within a cluster printing dialog, a user may choose to use multiple printing devices and may choose to perform copy splitting, job splitting or other cluster printing options. A cluster printing dialog may comprise a display of all the selectable printing devices in the cluster from which a user may select one, none, multiple, or all of the devices to which a print task may be despooled. Cluster printing options may also be pre-selected by prior printer settings by a user or administrator. Cluster printing options may also be communicated through a dialog presented by a print processor, spooler or other print system component and may be read from memory, disk, database, registry or elsewhere.

Prior to and during the despooling of a print task, several things can go wrong. These include, but are not limited to: 1) printer unavailability (offline); 2) busy printer; 3) printer port problems; and 4) printer queue problems. The following sections describe systems for recovering from these errors, by job rollover, job redistribution, job restarting and other methods.

Some embodiments of the present invention may also detect errors after despooling of a print task. These embodiments can monitor communication between a bi-directional printing device and a spooler, between a network queue and a printer, between a remote printer and a spooler and between similar print system components and printing devices. When errors occur, these embodiments may redirect, redistribute or otherwise provide automated error correction.

Figure 16:
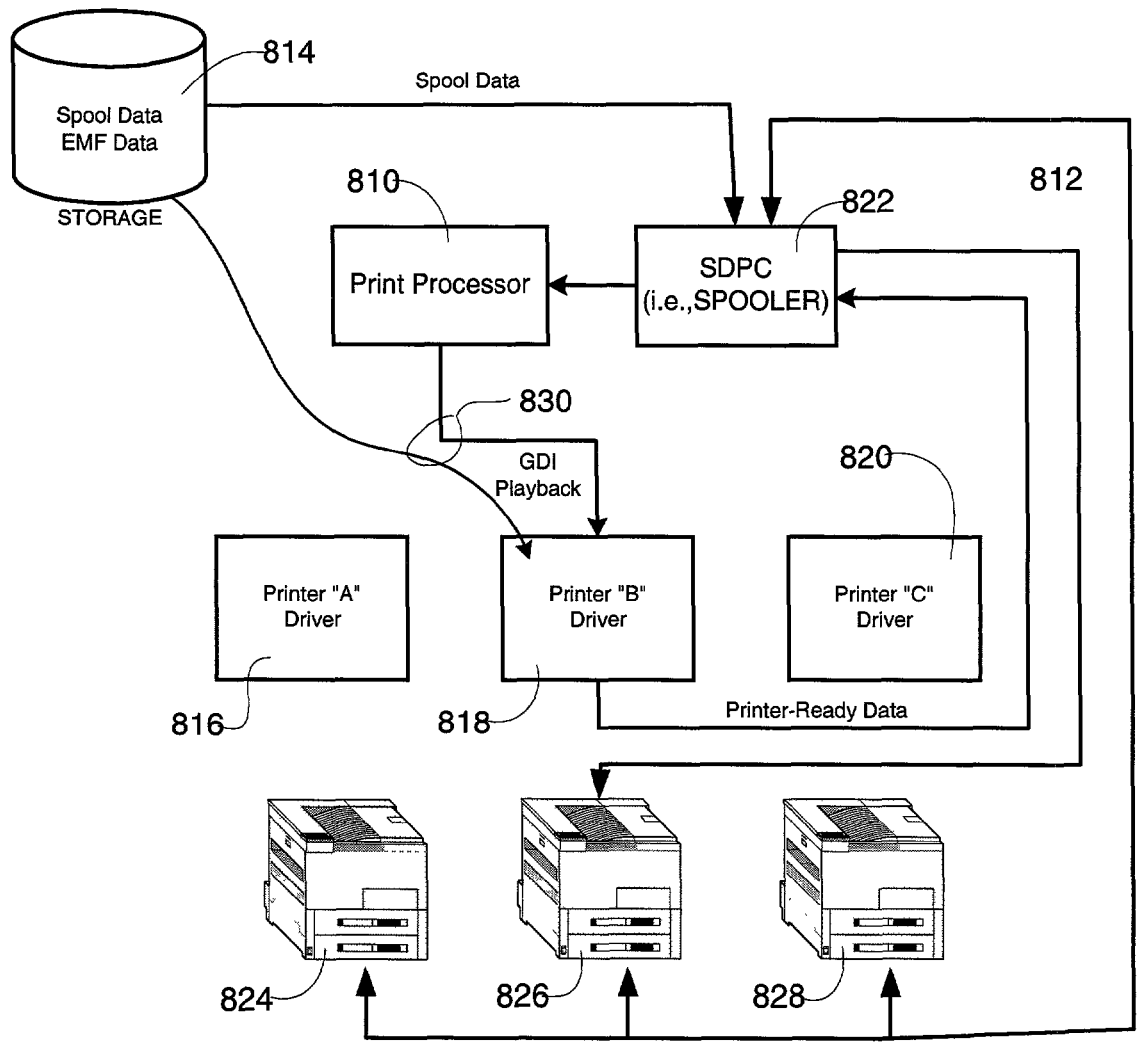
FIG. 16 is a diagram depicting an embodiment of the present invention comprising print task redirection with EMF mode printing.

When an error occurs in EMF mode printing prior to despooling of the print task, embodiments of the present invention may roll the task over to another available device, as described in reference to FIG. 16. Upon initiation of a print task, but prior to despooling, the print system component, such as spooler 822 checks 812 the status of printers 824, 826 and 828 in communication with the user's computing device. Printers 824, 826 and 828 may be ready, offline, busy, in an error state or some other status. If the status is offline, busy or an error state the printer may be determined to be unavailable. If the print task is configured for a single printer, by default, the print task would be sent to the default printer 824 associated with the default print driver 816. If this printer is unavailable, the print system component 822 will roll over the print task to the next available printer 826 through its driver 818. If no printer is available, the print system component 822 may roll over the print task to the next printer whose status is busy 828 through its driver 820. If all printers are unavailable, the print task may be cancelled and the user notified. When a print task is rolled over to a printer other than its original destination, the print system component 822 will play back 830 the journaled data to the print driver 818 associated with the printer 826 to which the print task was rolled over, and notify the user of the task destination and/or status.

Figure 17:
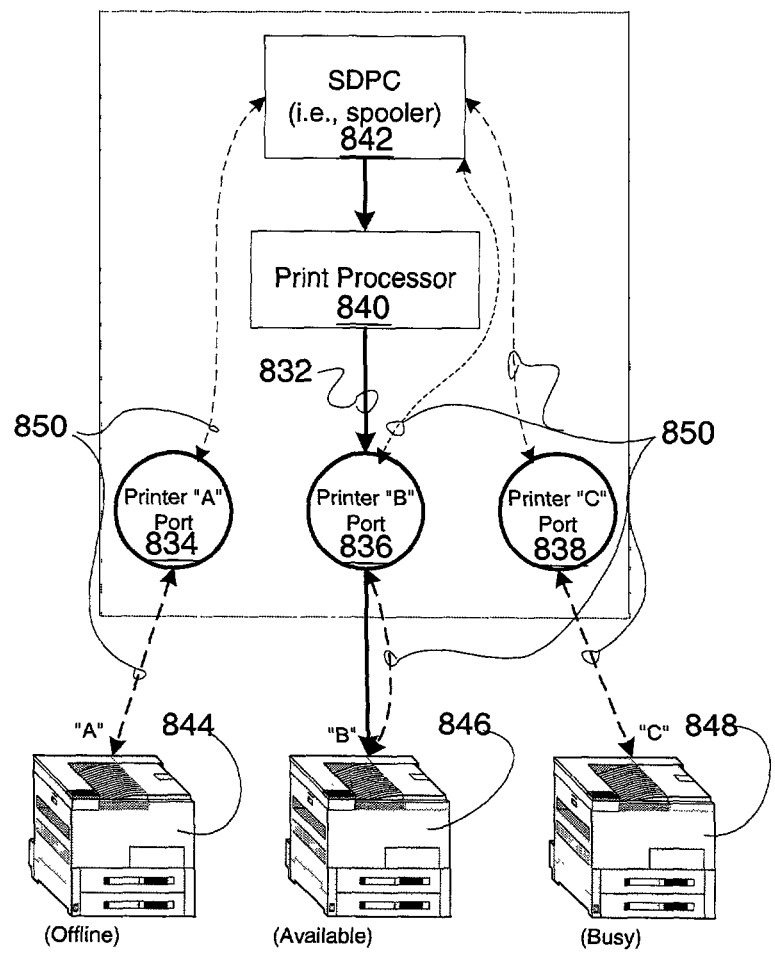
FIG. 17 is a diagram depicting an embodiment of the present invention comprising error recovery in EMF mode.

When an error occurs in RAW mode printing prior to despooling of the print task, embodiments of the present invention may roll the task over to another available device, as described in reference to FIG. 17. Upon initiation of a print task, but prior to despooling, a SDPC 842 may check 850 the status of printers in communication with the user's computing device. These printers may be classified as being available, offline, busy, in an error state or some other status. If the status is offline, busy or in an error state the printer may be determined to be unavailable. If the task is designated for a single printer, by default, the print task would be sent to the port 834 associated with the default printer 844. If the default printer 844 is unavailable, a SDPC 842 may roll over the print task to the port 836 associated with the next available printer. If no printer is available, the SDPC 842 may roll over the print task to the port 838 associated with the next printer whose status is busy 848. If all printers are unavailable, the print task may be canceled and the user notified. If the print task is rolled over to another printer, the SDPC 842 will write 832 the printer ready data to the printer port associated with the printer to which the print task was rolled over, and notify the user.

Figure 18:
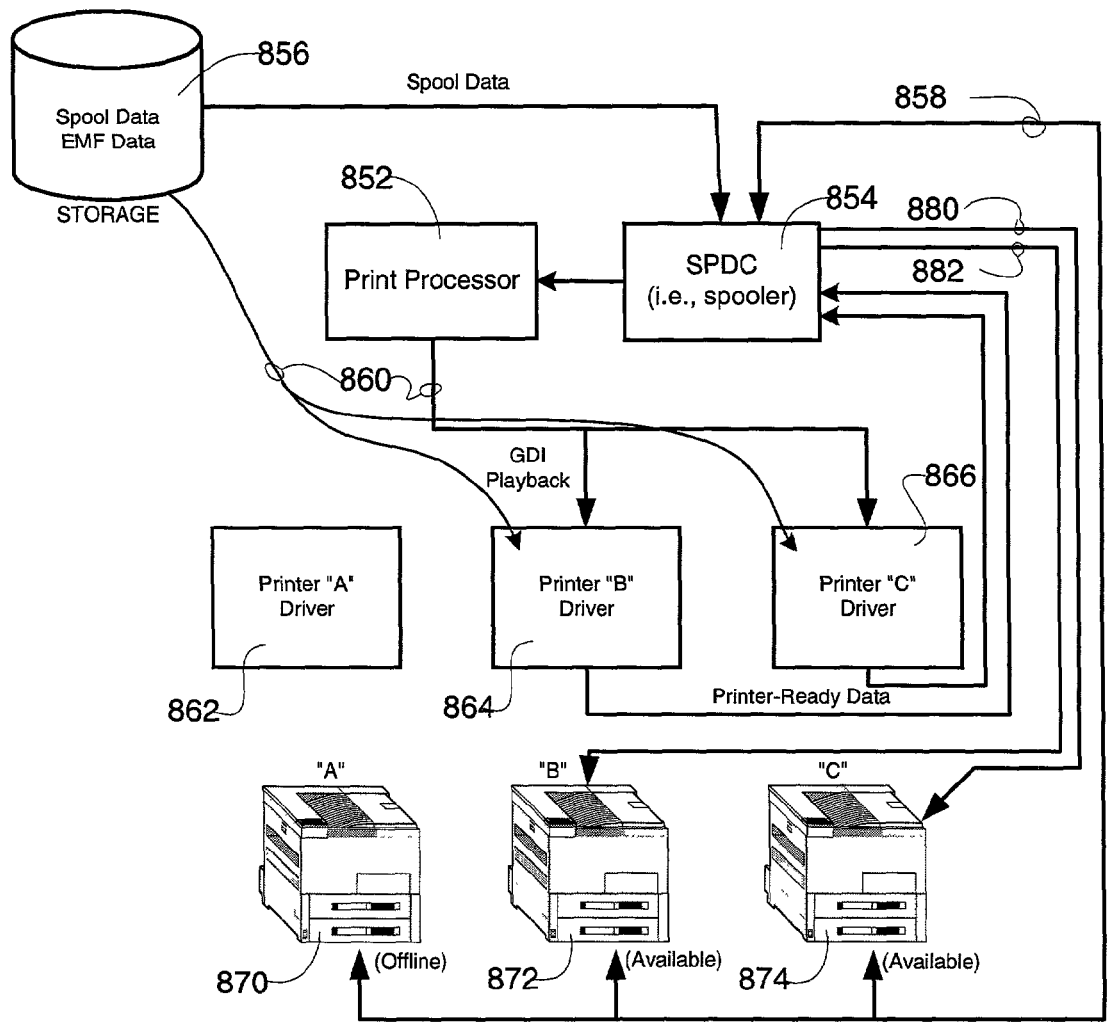
FIG. 18 is a diagram depicting an embodiment of the present invention comprising status detection and print task redirection.

When an error occurs in EMF mode printing prior to despooling of the print task, embodiments of the present invention may redistribute the task to other available devices, as described in reference to FIG. 18. Upon initiation of a print task, but prior to despooling, a SDPC 854 may check 858 the status of printers 870, 872 and 874 in communication with the user's computing device. These printers 870, 872 and 874 may be classified as being ready, offline, busy, in an error state or some other status. If the status is offline, busy or in an error state the printer may be determined to be unavailable. If the task is configured for multiple printers, the print task may be redistributed across the available printers or a backup set of printers. If no printers are available, the print processor may redistribute the print task to printers whose status is busy. If all printers are unavailable, then the print task may be canceled and the user notified. When printers are available or simply busy, the SDPC may play back the journaled data to the print drivers associated with the printers to which the print task was redistributed and notify the user.

As a non-limiting example of this type of task redistribution, a user may select printer "A" 870 and printer "B" 872 as default printers for a cluster printing task. When the cluster task arrives at the SDPC, such as spooler 854, the SDPC 854 checks 858 the status of the printing devices and determines that printer "A" 870 is offline. Therefore, the original cluster task cannot be completed using the default selection. However, the SDPC 854 may determine that another printer is available to take the place of printer "A" 870, for example, printer "C" 874 may be available. In this case, SDPC 854 may redistribute the print task to printer "B" 872 and printer "C" 874. When this is done, the SDPC 854 may redistribute spool data and EMF files 856 to the drivers 864 and 866 associated with the available printing devices 872 and 874. This task playback 860 is sent to the available drivers 864 and 866 and on to a spooler 854 or another spooler for spooling 880 and 882 to the available printing devices 872 and 874.

Figure 19:
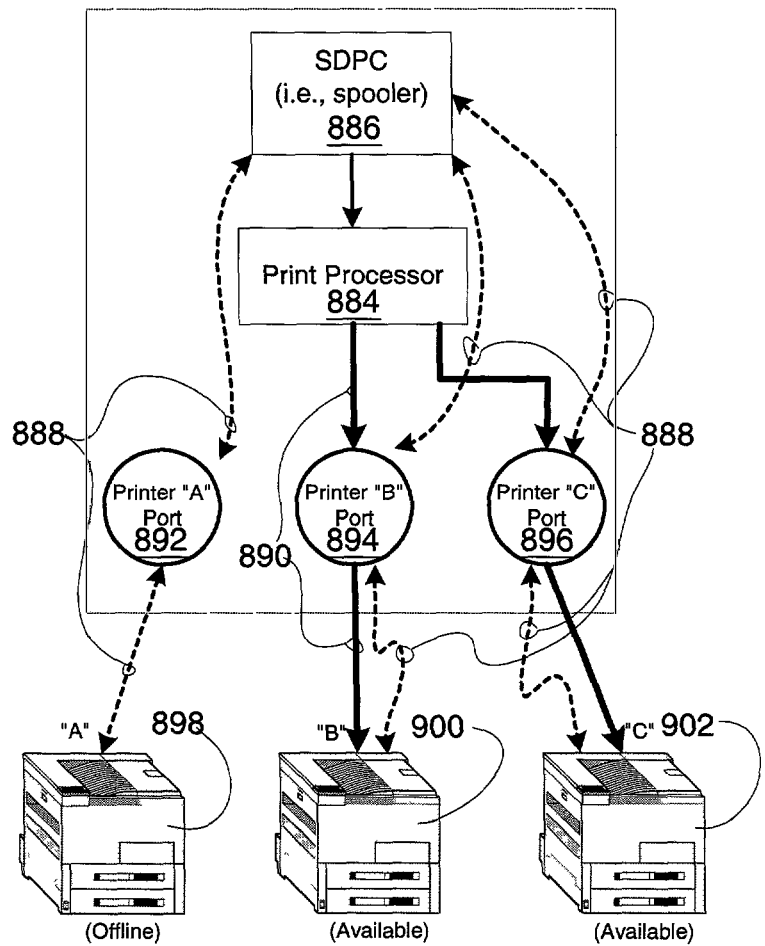
FIG. 19 is a diagram depicting an embodiment of the present invention comprising error recovery in RAW mode.

When an error occurs in RAW mode printing prior to despooling of the print task, embodiments of the present invention may redistribute the task to other available devices, as described in reference to FIG. 19. Upon initiation of a print task, but prior to despooling, the SDPC 886 may check 888 the status of printers 898, 900 and 902 in communication with the user's computing device. These printers 898, 900 and 902 may be classified as being available, offline, busy or some other status. If the status is offline, busy or in an error state the printer may be determined to be unavailable. When a task is configured for multiple printers, the print task may be redistributed across the available printers. If no printers are available, the SDPC 886 may redistribute the print task to printers whose status is busy. If all printers are unavailable, then the print task may be canceled and the user notified. When printers are available or simply busy, the SDPC 886 will write the printer ready data to the printer ports associated with the printers to which the print task was redistributed and notify the user of task destinations and status.

As a non-limiting example of this type of task redistribution in RAW mode printing, a user may select printer "A" 898 and printer "B" 900 as default printers for a cluster printing task. When the cluster task arrives at SDPC 886, the SDPC 886 checks 888 the status of the printing devices and determines that printer "A" 898 is offfine. Therefore, the original cluster task cannot be completed using the default selection. However, the SDPC 886 may determine that another printer is available to take the place of printer "A" 898, for example, printer "C" 902 may be available. In this case, SDPC 886 may redistribute the print task to printer "B" 900 and printer "C" 902. When this is done, the print processor 884 may redistribute printer ready data 890 to the ports 894 and 896 associated with the available printing devices 900 and 902. This task redistribution 890 is sent to the available printers' ports 894 and 896 and forwarded to the available printing devices 900 and 902.

Figure 20:
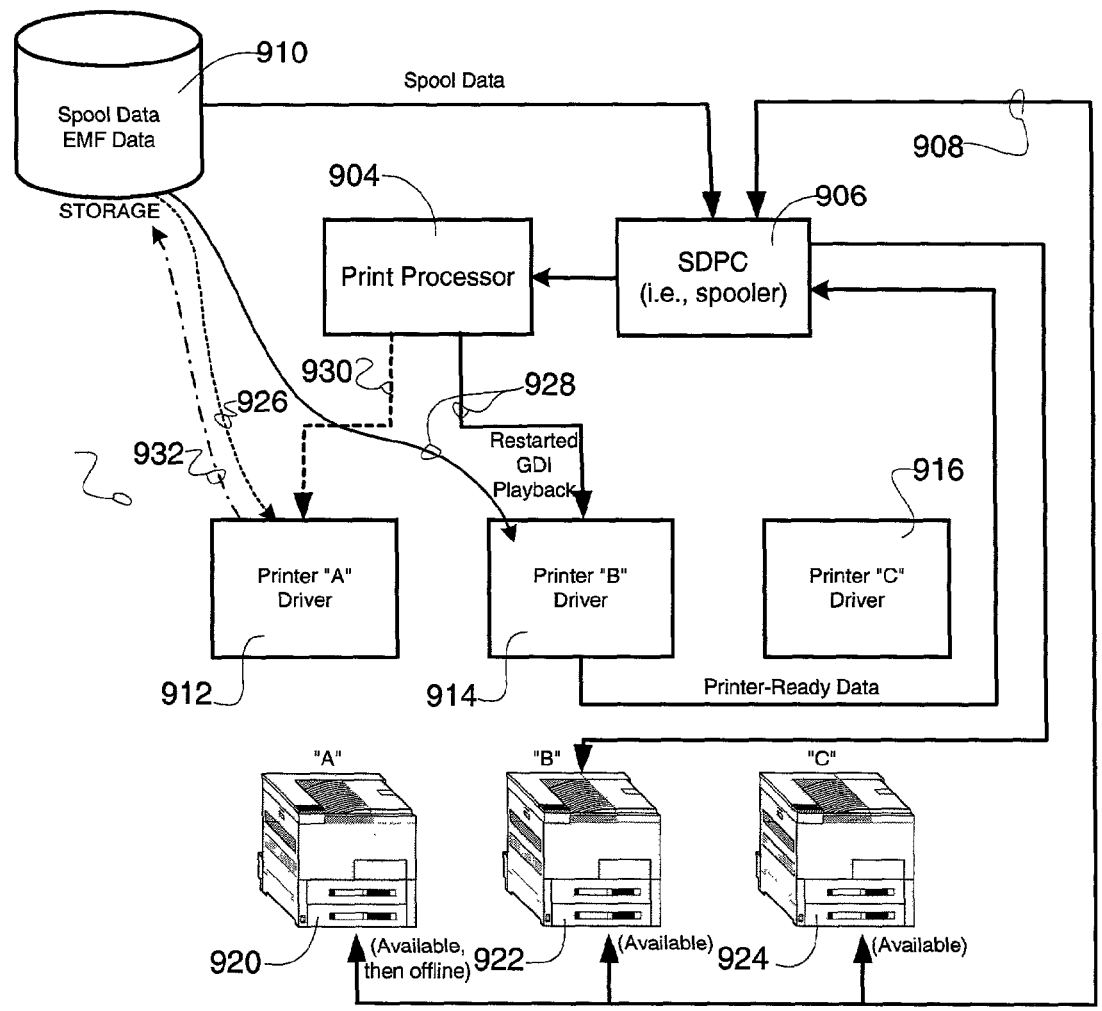
FIG. 20 is a diagram depicting an embodiment of the present invention comprising error recovery during despooling in EMF mode.

When an error occurs in EMF mode printing during despooling of the print task, embodiments of the present invention may rollover or redirect and restart the task on another available device, as described in reference to FIG. 20.

If a print task is configured for a single printer, during despooling (i.e., playback to driver in EMF mode), the SDPC 906 checks if the playback 930 of the journaled data to the printer driver 912 of the default printer 920 has failed. If the playback fails, the print task for this printer is aborted. The SDPC 906 then checks 908 the status of other printers in communication with the user's computing device. If the status is offline, busy or in an error state, the printer may be determined to be unavailable. The SDPC 906 may roll over and restart the print task on the next available printer in the cluster. If no printer is available in the cluster, then the print processor will roll over and restart the print task to the next printer whose status is busy. If the playback on the rolled over printer fails, the SDPC 906 will repeat the above steps and roll over and restart the print task on another printer in the cluster. If all printers are unavailable, the print task may be canceled and the user notified. If the print task is rolled over to another printer in the cluster, the SDPC 906 may restart the playback of the journaled data to the print driver associated with the printer to which the print task was rolled over and notify the user.

As a non-limiting example of this type of task rollover during despooling, a user may select printer "A" 920 as a default printer for a printing task. When the task arrives at the SDPC 906, the SDPC 906 may check the status of connected printing devices and determine printer availability as explained above. When an appropriate printing device has been selected, playback of spool data 930 and EMF data 926 may begin. In this example, the default device 920 is originally determined to be available and the print task is sent to the default destination, the driver 912 associated with the default printer 920. However, during despooling of the print task to the default printer driver 912, a problem occurs which causes a failure in the printing process. This failure is communicated to the SDPC 906, thereby signaling the print processor 904 to abort task playback. The SDPC 906 then checks 908 the status of the printing devices and again determines their availability. When another printer 922 is available, the SDPC 906 may restart playback 928 of the print task to the driver 914 associated with the available printer 922. The driver 914 then interprets the task data and forwards the task to a spooler, such as SDPC 906, or another spooler to be spooled to the new destination printer 922.

Figure 21:
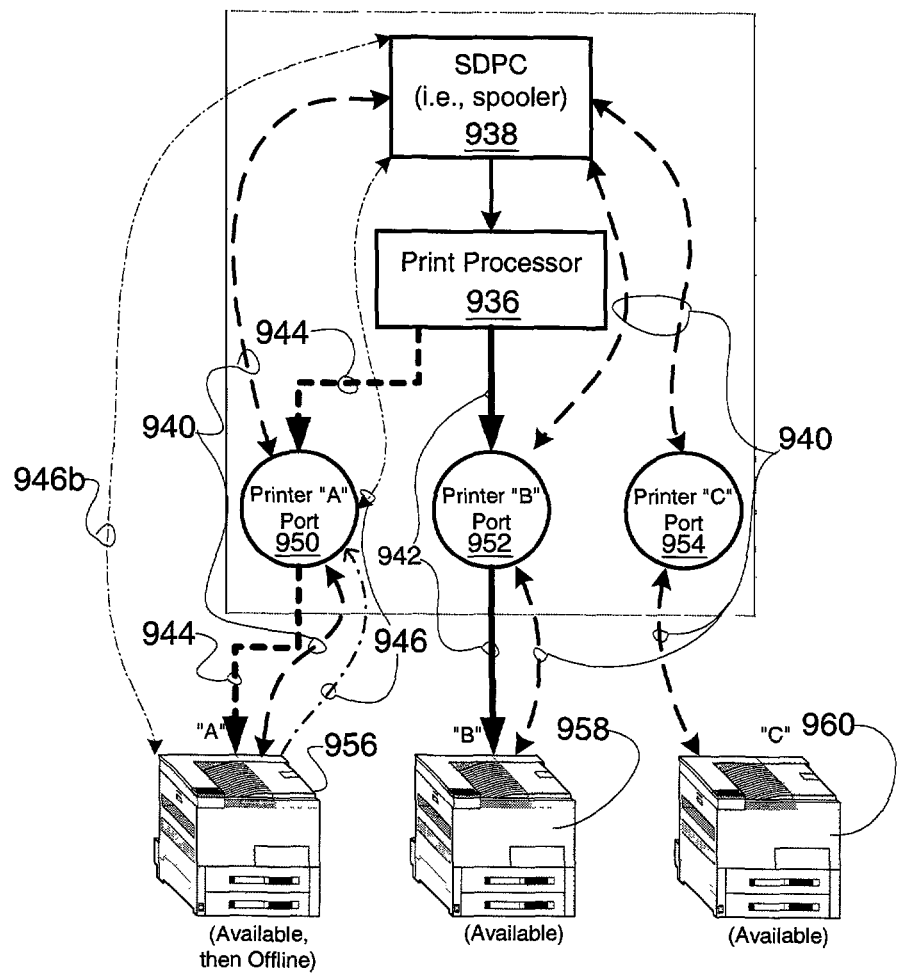
FIG. 21 is a diagram depicting an embodiment of the present invention comprising error recovery during despooling in RAW mode.

When an error occurs in RAW mode printing during despooling of the print task, embodiments of the present invention may rollover or redirect and restart the task on another available device, as described in reference to FIG. 21. If the print task is configured for a single printer, during despooling (i.e., write to printer port in RAW mode), the SDPC 938 checks if the write 944 of the printer ready data to the printer port 950 of the default printer has failed. If the write has failed, the print task for this printer may be aborted. The SDPC 938 then checks 940 the status of the remaining printers in the cluster. If the status is offline, busy, in an error state or similar status, the printer may be determined to be unavailable. The SDPC 938 may roll over and restart the print task on the next available printer in the cluster. If no printer is available, the SDPC 938 may roll over and restart the print task to the next printer whose status is busy. If the write to an alternative printer fails, the SDPC 938 may repeat the above steps and roll over and restart the print task to another printer. If all printers are unavailable, then the print task may be canceled and the user notified. If the print task is rolled over to another printer, the SDPC 938 may restart the write of the printer ready data to the printer port associated with the printer to which the print task was rolled over and notify the user.

As a non-limiting example of this type of task redistribution in RAW mode printing, a user may select printer "A" 956 as the default printer for a printing task. When the task arrives at the SDPC 938, the SDPC 938 checks 940 the status of connected printing devices and determines that printer "A" 956 is available. Accordingly, SDPC 938 directs the print task to printer "A" 956, as explained above. However, during despooling, the original write of the print task 944 may fail. When this occurs, a failure message 946 may be directed to the SDPC 938 to signal that the task has not been completed. When a failure message 946 is received, the SDPC 938 may again check 940 the status of printing devices and determine their availability. As printer "B" 958 is available at this time, the print task may be rolled over to that printer 958. This is performed as SDPC 938 restarts the printer write process 942 to the newly selected printer's port 952. The task is then routed to the destination printer 958. If the print task again fails, the SDPC 938 may again redirect the print task to another available printer or busy printer as explained above.

Figure 22:
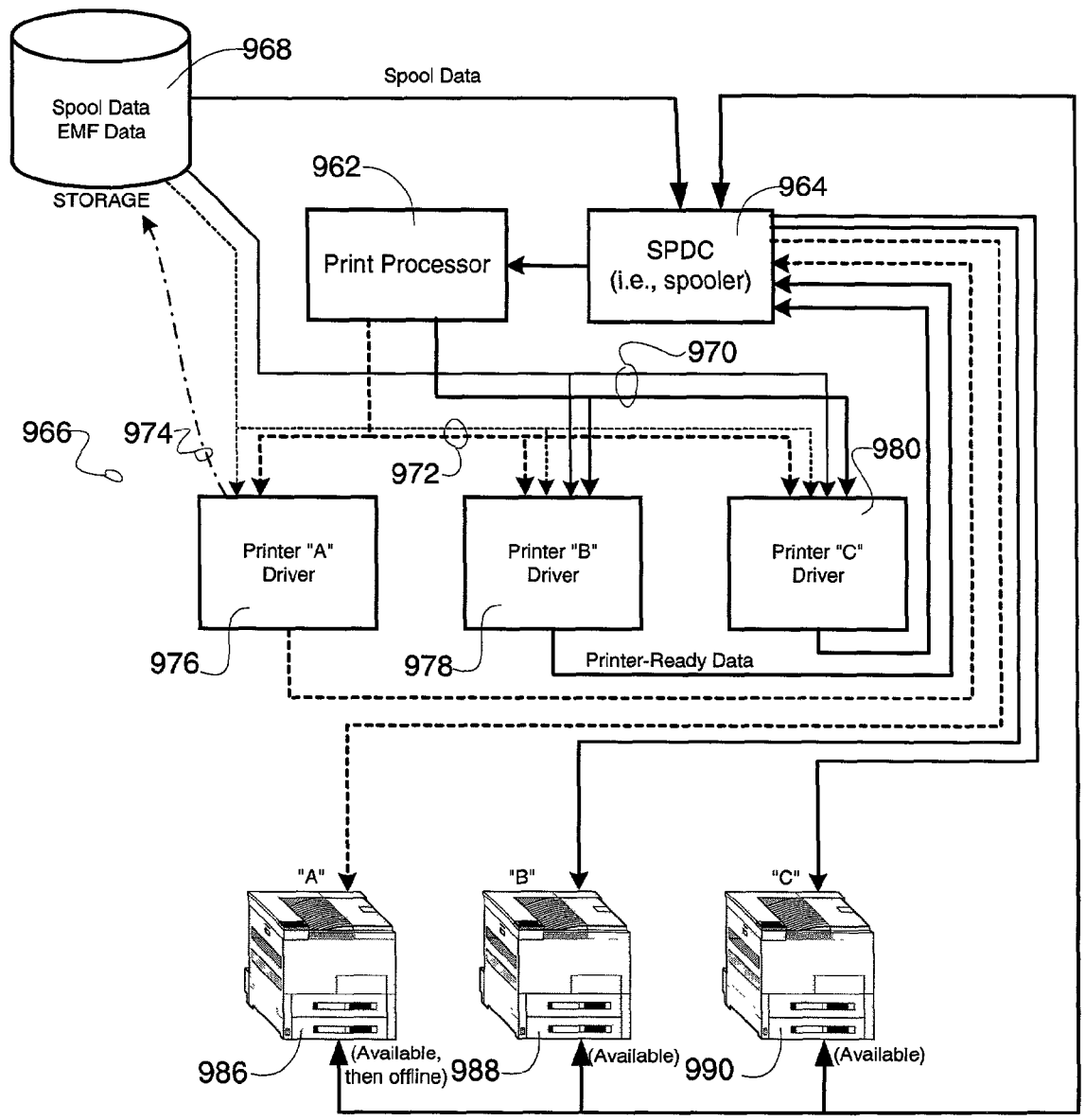
FIG. 22 is a diagram depicting an embodiment of the present invention comprising error recovery with cluster printing during despooling in EMF mode.

When an error occurs in EMF mode printing during despooling of a cluster print task, embodiments of the present invention may redistribute and restart the task or tasks on other available devices, as described in reference to FIG. 22. When a cluster printing task is printed, multiple printers will be involved and job splitting or copy splitting may be used. During despooling of these tasks (i.e., playback to driver in EMF mode) the SDPC 964 may verify that the playback 972 of the journaled data to each of the printer drivers 976, 978 and 980 of the selected printers 986, 988 and 990 is progressing properly. If the original playback 972 to a printer fails, the print task for that printer may be aborted. When this occurs, the SDPC 964 may then check the status of other printers. If the status is offline, busy, in an error state or similar status, the printer is determined to be unavailable. A SDPC 964 may restart and redistribute the failed portions of the print task or modified print tasks on the remaining available printers in the cluster. If no printer is available, the SDPC 964 may restart and redistribute the failed portions of the print task or modified print tasks to printers whose status is busy. If the playback on one or more of the restarted printers fails, the SDPC 964 will repeat the above steps and restart and redistribute the print task or portions thereof on the remaining printers. If all printers are unavailable, the print task may be canceled and the user notified. If the failed portions of the print task are restarted and redistributed to the remaining printers, the SDPC 964 will restart the playback 970 of the journaled data of the failed portion of the print task to the print drivers associated with the printers to which the failed portions of the print task were redistributed, and notify the user.

As a non-limiting example of this type of print task or modified print task redistribution, a user may select Printers A, B and C 986, 988 and 990 for printing a cluster printing task. As a result, separate print tasks or modified print tasks will be output from SDPC 964 and directed to the selected printers. A SDPC 964 may check 966 the status of the selected printers to verify their availability and redirect when necessary, however, in this example, the selected printers are available. Accordingly, the spool data and EMF files of the tasks are played back 972 to the printer drivers 976, 978 and 980 of the selected printers 986, 988 and 990. During playback 972, the SDPC 964 monitors the status of the print tasks to verify that they complete properly. When an error occurs, a failure message 974 is sent to the SDPC 964 to signal that a task will need to be redistributed. The SDPC 964 will then recheck 966 the status of connected printers and determine their availability. If other printers are found beyond the originally selected printers 986, 988 and 990 they may be added to the currently used group and the failed task may be directed to another printer not currently being used. However, in this example, no other printers are available and the SDPC 964 is forced to redistribute the failed task to the printers currently in use. Accordingly, the SDPC 964 redistributes the failed print task to printers B and C 988 and 990. This is achieved by restarting the playback 970 of the failed print task to the drivers 978 and 980 of these printers. In this case the failed print task must be reconfigured for two printers rather than the original one that failed. Once the print task is processed by the printer drivers 978 and 980, the print task is forwarded to a spooler, such as SDPC 964 when SDPC 964 is a spooler or another spooler and passed on to the destination printers 988 and 990 for completion.

Figure 23:
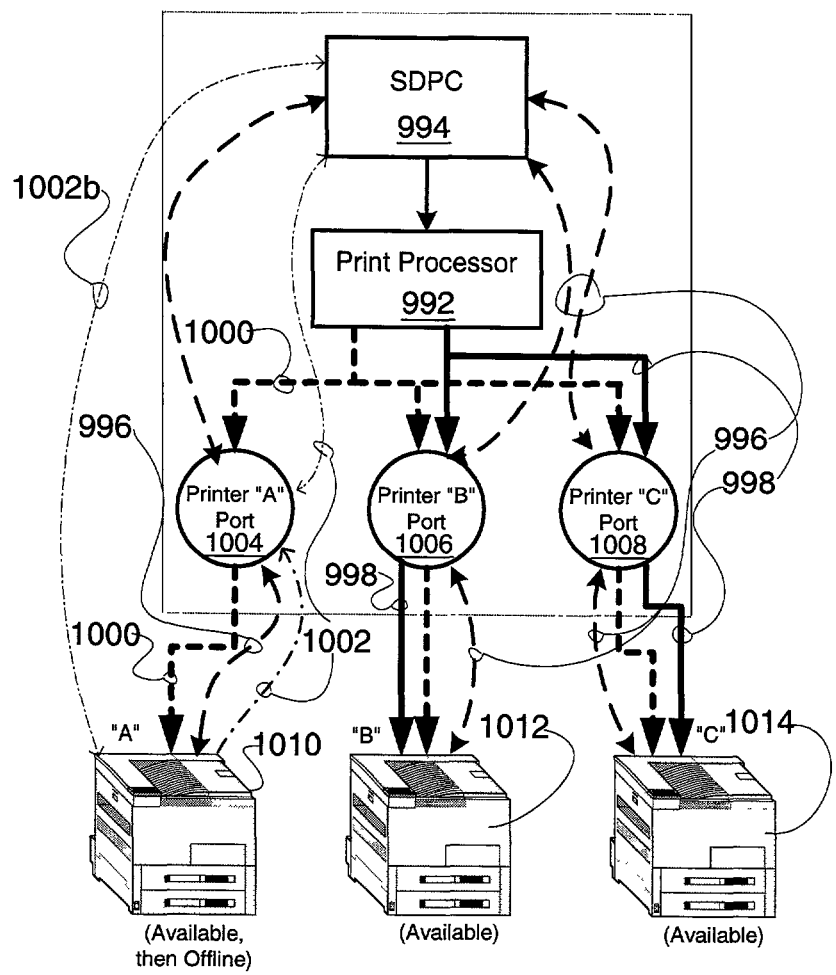
FIG. 23 is a diagram depicting an embodiment of the present invention comprising error recovery with cluster printing during despooling in RAW mode.

When an error occurs in RAW mode printing during despooling of a cluster print task, embodiments of the present invention may redistribute and restart the task or tasks on other available devices, as described in reference to FIG. 23. During despooling (i.e., write to printer port in RAW mode), the SDPC 994 may check if the write 1000 of the printer ready data to each of the printer ports 1004, 1006 and 1008 of the selected printers 1010, 1012 and 1014 is being completed. If the write to a printer fails, the print task for that printer is aborted. The SDPC 994 may then check the status of other printers. If the status is offline, busy, in an error state or similar status the printer is determined to be unavailable. The SDPC 994 may restart and redistribute the failed portions of the print task to the remaining available printers. If no printer is available in the cluster, the SDPC 994 may restart and redistribute the failed portions of the print task to printers whose status is busy. If the write to the printer port of one or more of the restarted printers fails, the SDPC 994 may repeat the above steps and restart and redistribute the print task on other printers. If all printers are unavailable, the print task may be canceled and the user notified. If the failed portions of the print task are restarted and redistributed to the remaining printers in the cluster, the SDPC 994 will restart the write 998 of the printer ready data of the failed portion of the print task to the printer ports associated with the printers to which the failed portions of the print task were redistributed and notify the user.

In a non-limiting example of this type of print task redistribution and error recovery, a user may select a group of printers 1010, 1012 and 1014. The SDPC 994 will write the print task to the ports 1004, 1006 and 1008 associated with the selected printers 1010, 1012 and 1014 until an error occurs. If an error occurs, a failure message 1002 may be sent to the SDPC 994. When a failure message 1002 is received, the SDPC 994 may abort the print task directed to the failed device and recheck 996 the status of printers in connection with the SDPC 994. If other printers are available, the failed task may be redirected to those other printers, however, in this example, no other printers are available, therefore, the failed print task is redirected to printers 1012 and 1014 in the original group which may or may not have completed the other portions of the original print task. The failed print task is reconfigured for printing on two printers and redistributed. This is achieved by restarting the write 998 to the new printer selection. The restarted write 998 redirects the print task to the ports 1006 and 1008 associated with the available or busy printers 1012 and 1014.

Figure 24:
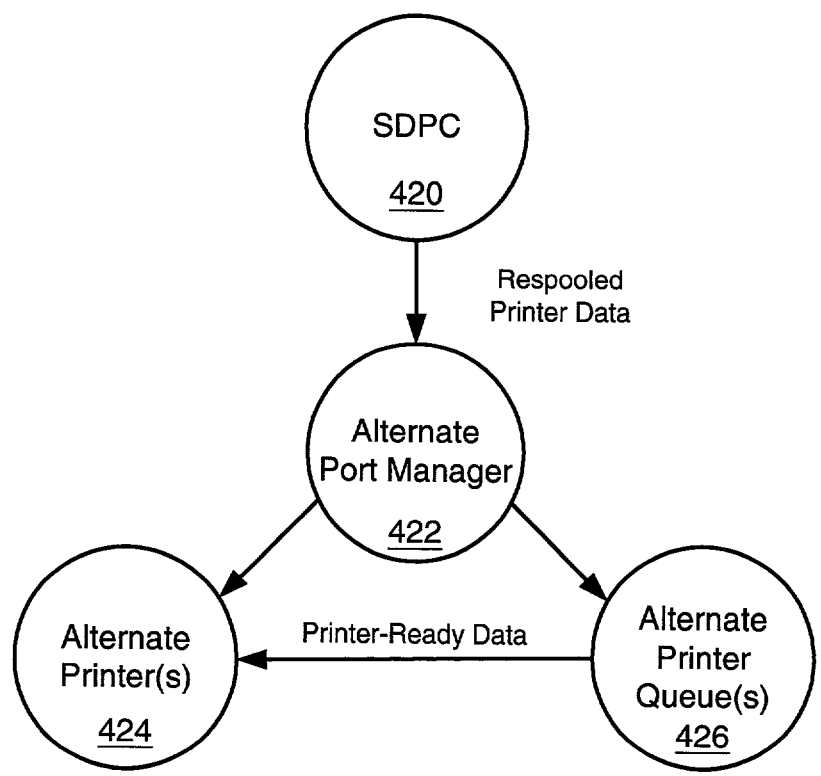
FIG. 24 is a diagram depicting an embodiment of the present invention comprising post-spooling error recovery.

In some embodiments of the present invention illustrated diagrammatically in FIG. 24, a SDPC 420 can respool the unprinted portions of a print job to the port managers 422 of alternative printers 424. If the printer 424 is connected locally, the port manager 422 may despool the printer-ready data directly to the printer 424. If the printer 424 is connected remotely, the port manager 422 may establish a virtual circuit with the printer 424 and despool the printer-ready data directly to the printer 424. If the printer is a network-connected printer, the port manager 422 may despool the printer-ready data to the printer queue 426 associated with the printer 424 and later despooled by the corresponding print server's spooler.

Figure 25:
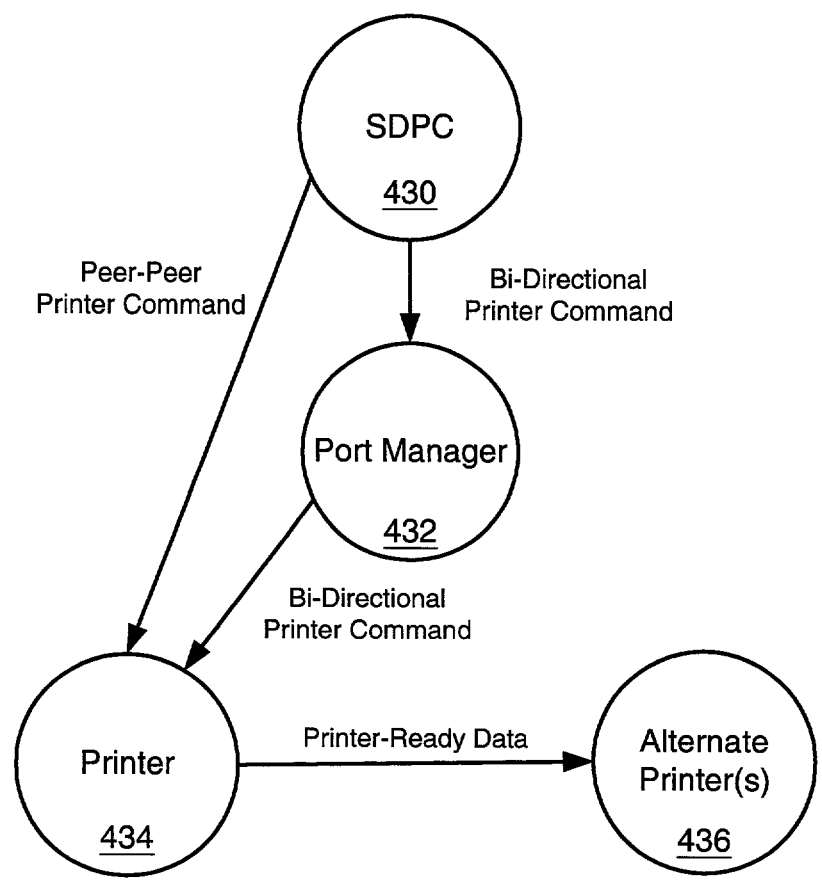
FIG. 25 is a diagram depicting an embodiment of the present invention comprising post-spooling error recovery with printers having firmware spooling capability.

In some embodiments of the present invention illustrated diagrammatically in FIG. 25, a SDPC 430 may exist in a hybrid print environment, where printers support firmware despooling. In this type of scenario, a SDPC 430 may instruct the firmware spooler of a failed printer 434 to despool the unprinted portion of the print data to an alternate printer 436. If the alternate printer 436 is connected locally, the port manager 432 may instruct the printer's firmware to despool the unprinted portion of the print data to the alternate printer. If the alternate printer 436 is connected remotely, the port manager 432 may establish a virtual circuit to the alternate printer and instruct the firmware of the failed printer 434 to despool to the alternate printer 436.

Figure 26:
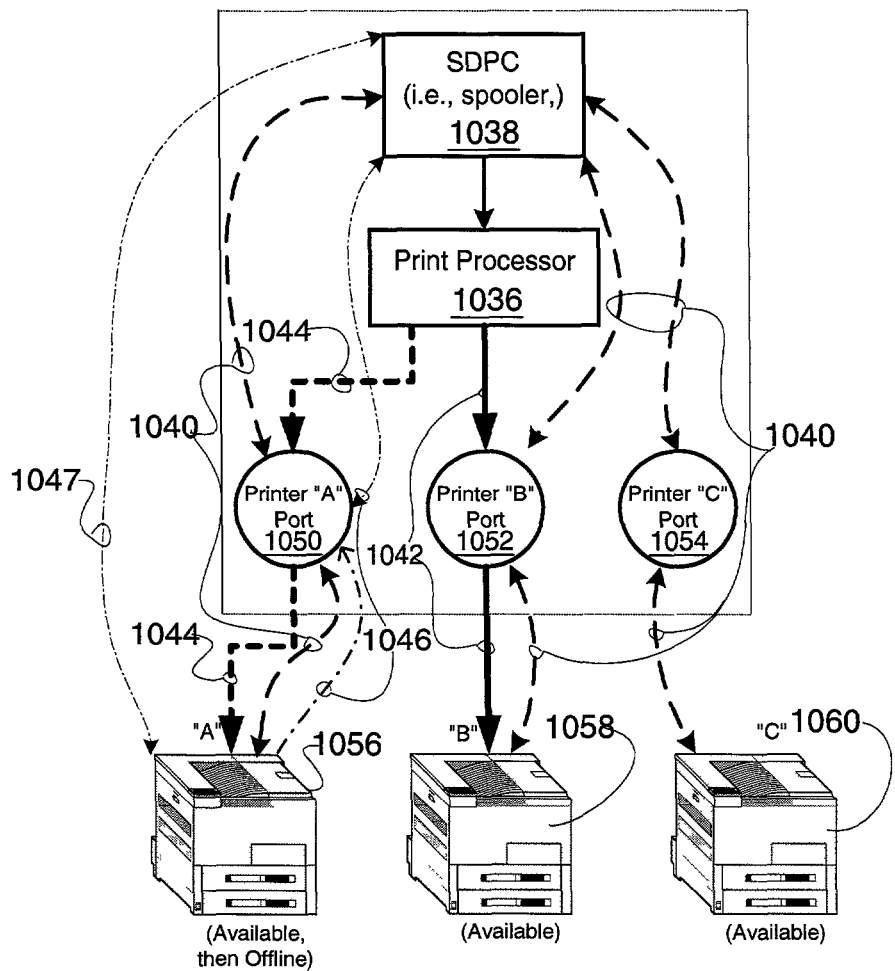
FIG. 26 is a diagram depicting an embodiment of the present invention comprising post-spooling error recovery.

When a printing error occurs after despooling of the print task, embodiments of the present invention may rollover or redirect and restart the task on another available device, as described in reference to FIG. 26. This may occur for tasks that originated as EMF mode or RAW mode tasks, as both types are generally converted to Raw mode data during initial despooling of the print task to a printer.

If the print task is configured for a single printer, after despooling is complete (i.e., all writes to printer port in RAW mode are complete), the SDPC 1038 may check or wait to be informed whether the printing or finishing 1044 of the printer ready data sent to default printer has failed. If the printing or finishing has failed, the print task for this printer may be restarted. The SDPC 1038 may then check 1040 the status of the remaining printers in the cluster. If the status is offline, busy, in an error state or similar status, the printer may be determined to be unavailable. The SDPC 1038 may roll over and restart the print task on the next available printer in the cluster. If no printer is available, the SDPC 1038 may roll over and restart the print task to the next printer whose status is busy. If the write to an alternative printer or the printing or finishing on the alternative printer fails, the SDPC 1038 may repeat the above steps and roll over and restart the print task to another printer. If all printers are unavailable, then the print task may be canceled and the user notified. If the print task is rolled over to another printer, the SDPC 1038 may restart the write of the printer ready data to the printer port associated with the printer to which the print task was rolled over and notify the user.

As a non-limiting example of this type of task redistribution after despooling, a user may select printer "A" 1056 as the default printer for a printing task. When the task arrives at the SDPC 1038, the SDPC 1038 checks 1040 the status of connected printing devices and determines that printer "A" 956 is available. Accordingly, SDPC 1038 directs the print task to printer "A" 1056, as explained above. However, after despooling, the printing or finishing of the print task may fail. When this occurs, a failure message 1046 or 1047 may be directed to the SDPC 1038 to signal that printing or finishing have failed. When bi-directional printers are used, failure message 1046 may be transmitted through a printer port, such as port 150. In other scenarios, such as non-bi-directional network printers, failure message 1047 may be transmitted over the network.

When a failure message 1046 or 1047 is received, the SDPC 1038 may again check 1040 the status of printing devices and determine their availability. As printer "B" 1058 is available at this time, the print task may be rolled over to that printer 1058. This is performed as SDPC 1038 restarts the printer write process 1042 to the newly selected printer's port 1052. The task is then routed to the destination printer 1058. If the print task again fails, the SDPC 1038 may again redirect the print task to another available printer or busy printer as explained above.

Figure 27:
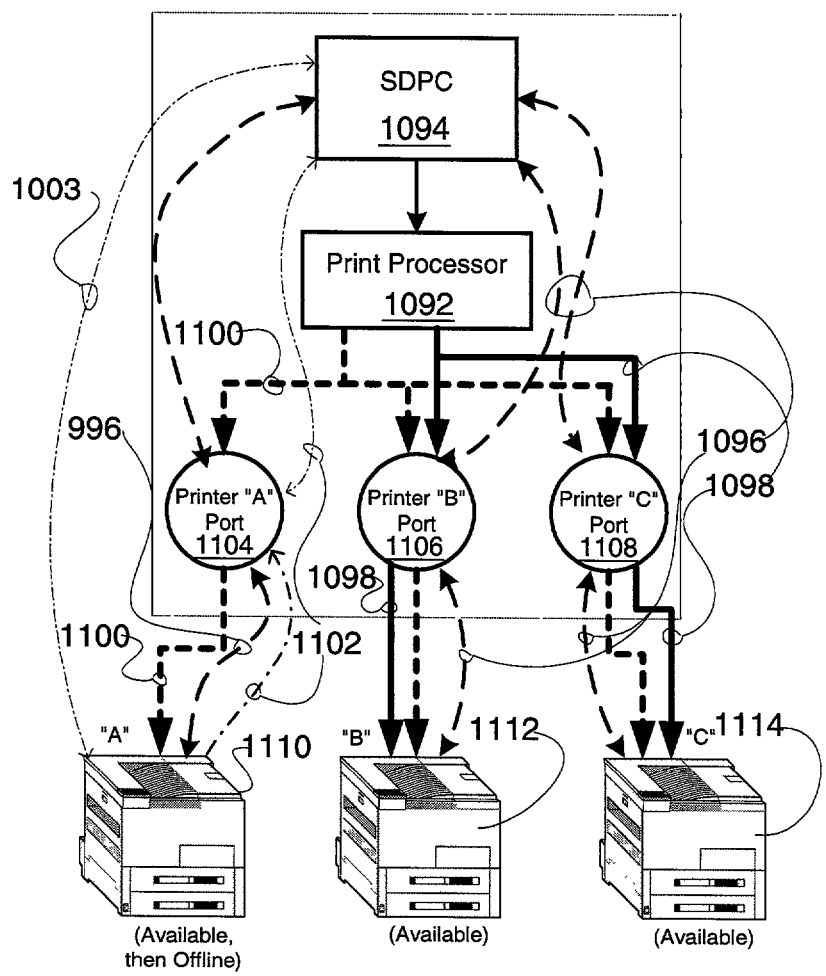
FIG. 27 is a diagram depicting an embodiment of the present invention comprising post-spooling error recovery with cluster printers.

When an error occurs after despooling of a cluster print task, embodiments of the present invention may redistribute and restart the task, tasks, modified task or tasks or portions of tasks on other available devices, as described in reference to FIG. 27. After despooling is complete (i.e., all writes to printer port in RAW mode are complete), the SDPC 1094 may check or wait to be informed whether the printing and finishing of the printer ready data sent to each of the selected printers 1110, 1112 and 1114 is complete. If the printing and finishing on one or more of these printers 1110, 1112 and 1114 fails, the print task for that printer(s) may be restarted. The SDPC 1094 may then check the status of other printers. If the status is offline, busy, in an error state or similar status the printer is determined to be unavailable. The SDPC 1094 may restart and redistribute the failed portions of the print task to the remaining available printers. If no printer is available in the cluster, the SDPC 1094 may restart and redistribute the failed portions of the print task to printers whose status is busy. If the write to the printer port of one or more of the restarted printers fails, the SDPC 1094 may repeat the above steps and restart and redistribute the print task on other printers. If all printers are unavailable, the print task may be canceled and the user notified. If the failed portions of the print task are restarted and redistributed to the remaining printers in the cluster, the SDPC 1094 will restart the write 1098 of the printer ready data of the failed portion of the print task to the printer ports associated with the printers to which the failed portions of the print task were redistributed and notify the user.

In a non-limiting example of this type of print task redistribution and error recovery, a user may select a group of printers 1110, 1112 and 1114. The SDPC 1094 will write the print task to the ports 1104, 1106 and 1108 associated with the selected printers 1110, 1112 and 1114. After despooling to the ports 1104, 1106 and 1108, a SDPC 1094 may check or wait to be informed whether the printing or finishing is complete. If a printing or finishing error occurs, a failure message 1102 or 1103 may be sent to the SDPC 1094. When a failure message 1102 or 1103 is received, the SDPC 1094 may recheck 1096 the status of printers in connection with the SDPC 1094. If other printers are available, the failed task may be redirected to those other printers, however, in this example, no other printers are available, therefore, the failed print task is redirected to printers 1112 and 1114 in the original group which may or may not have completed the other portions of the original print task. The failed print task is reconfigured for printing on two printers and redistributed. This is achieved by restarting the write 1098 to the new printer selection. The restarted write 1098 redirects the print task to the ports 1106 and 1108 associated with the available or busy printers 1112 and 1114.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of printing from a computing device, said method comprising:
    initiating a print task from an application running on a computing device;
    receiving a selection of a preferred printing device;
    sending said print task to a print system component residing on said computing device;
    checking the status of at least one printing device, comprising said preferred printing device, in communication with said computing device, said checking being accomplished automatically via a direct communication between said at least one printing device and said print system component residing on said computing device;
    sending said print task from said print system component to said preferred printing device if it is available; and
    sending said print task from said print system component to another available printing device if said preferred printing device is not available;
    identifying a printing error on the recipient printing device to which said print task was sent via a direct, bi-directional communication between said recipient printing device and said print system component;
    checking the status of at least one alternative printing device via a direct communication between said at least one alternative printing device and said print system component, wherein all calculations performed for said checking the status of at least one alternative printing device are performed on said print system component based on data obtained from a Simple Network Management Protocol (SNMP) Management Information Base (MIB) on said at least one alternative printing device, wherein said data is obtained from said MIB by sending SNMP protocol data units (PDUs) to said at least one alternative printing device to determine device status; and
    redirecting said print task to said at least one alternative printing device, with said print system component, when said at least one alternative printing device is available.

2. The method of claim 1 wherein said print system component residing on said computing device is a spooler.

3. The method of claim 1 wherein said checking the status of at least one alternative printing device occurs after said printing error is identified.

4. The method of claim 1 wherein said sending comprises transmitting spool data and EMF data to a device driver which converts said spool data and said EMF data to printer ready data which is sent via a spooler to a printing device.

5. The method of claim 1 wherein said sending comprises transmitting printer ready data from said print system component residing on said computing device through a printing device port to a printing device.

6. The method of claim 1 wherein said receiving a selection of a preferred printing device comprises receiving a user printer preference.

7. A method for increasing the reliability of a printing system, said method comprising:
    initiating a print task from an application running on a computing device;
    receiving a selection of a preferred group comprising a plurality of preferred printing devices;
    sending said print task to a print system component residing on said computing device;
    reconfiguring said print task into multiple print jobs comprising a first print job and a second print job with said print system component;

checking the status of printing devices, in said preferred group, in communication with said computing device through automatic, direct, bi-directional communication between said print system component residing on said computing device and said printing devices;

sending said first print job and said second print job from said print system component residing on said computing device to a first printing device and a second printing device, respectively, when said first printing device and said second printing device are available, wherein said preferred group comprises said first printing device and said second printing device;

rechecking the status of said first printing device and said second printing device during printing of said print jobs via direct, bi-directional communication between said first printing device and said print system component, wherein all calculations performed for said rechecking the status of said first printing device and said second printing device are performed on said print system component based on data obtained from Simple Network Management Protocol (SNMP) Management Information Bases (MIBs) located on said first printing device and said second printing device, wherein said data is obtained from said MIBs by sending SNMP protocol data units (PDUs) to said first printing device and said second printing device to determine device status;

if said first printing device fails to print said first print job;
  checking the status of other printing devices in said preferred group;
  sending said first print job from said print system component to a third printing device in said preferred group when said third printing device is available;
  sending said first print job from said print system component to said second printing device in said preferred group when another printing device is not available.

8. A tangible computer-readable medium comprising computer-executable instructions for performing functions within a print system component, said instructions comprising:

receiving a print task from an application running on a computing device;

receiving a selection of a preferred group of preferred printing devices;

sending said print task to a print system component residing on said computing device;

checking the status of at least one printing device, comprising said preferred printing device, in communication with said computing device, said checking being accomplished automatically via a direct communication between said at least one printing device and said print system component residing on said computing device;

sending said print task from said print system component to said preferred printing device if it is available; and sending said print task from said print system component to another available printing device if said preferred printing device is not available;

identifying a printing error on the recipient printing device to which said print task was sent via a direct, bi-directional communication between said recipient printing device and said print system component;

checking the status of at least one alternative printing device in said preferred group, to which said print task was not previously sent, via direct communication between said at least one alternative printing device and said print system component, wherein all calculations performed for said checking the status of at least one alternative printing device are performed on said print system component based on data obtained from a Simple Network Management Protocol (SNMP) Management Information Base (MIB) on said at least one alternative printing device, wherein said data is obtained from said MIB by sending SNMP protocol Page data units (PDUs) to said at least one alternative printing device to determine device status;

reconfiguring said print task for a different number of printers than the number to which it was originally sent when said different number of printers is available; and sending said reconfigured print task to said different number of printers.

\* \* \* \* \*